(12) United States Patent
Hyakudai

(10) Patent No.: US 10,700,898 B2
(45) Date of Patent: Jun. 30, 2020

(54) COMMUNICATION DEVICE, COMMUNICATION SYSTEM, COMMUNICATION METHOD, AND SURGICAL SYSTEM

(71) Applicant: Sony Corporation, Tokyo (JP)

(72) Inventor: Toshihisa Hyakudai, Kanagawa (JP)

(73) Assignee: Sony Corporation, Tokyo (JP)

( * ) Notice: Subject to any disclaimer, the term of this patent is extended or adjusted under 35 U.S.C. 154(b) by 9 days.

(21) Appl. No.: 15/540,512

(22) PCT Filed: Feb. 18, 2016

(86) PCT No.: PCT/JP2016/000867
§ 371 (c)(1),
(2) Date: Jun. 28, 2017

(87) PCT Pub. No.: WO2016/152015
PCT Pub. Date: Sep. 29, 2016

(65) Prior Publication Data
US 2018/0006850 A1   Jan. 4, 2018

(30) Foreign Application Priority Data

Mar. 26, 2015 (JP) .................. 2015-064081

(51) Int. Cl.
*H04L 12/28* (2006.01)
*H04L 25/14* (2006.01)
(Continued)

(52) U.S. Cl.
CPC .......... *H04L 25/14* (2013.01); *H04B 10/0771* (2013.01); *H04B 2210/07* (2013.01); *H04L 7/041* (2013.01)

(58) Field of Classification Search
None
See application file for complete search history.

(56) References Cited

U.S. PATENT DOCUMENTS 6,145,024 A * 11/2000 Maezawa ............. G06F 13/122
385/24
6,920,287 B1   7/2005 Hinds et al.
(Continued)

FOREIGN PATENT DOCUMENTS

EP   2 763 331 A1   8/2014
JP   S63-94741 A   4/1988
(Continued)

OTHER PUBLICATIONS

Japanese Office Action dated Nov. 28, 2017 for corresponding Japanese Application No. 2015-064081.

*Primary Examiner* — Gerald A Smarth
(74) *Attorney, Agent, or Firm* — Michael Best & Friedrich LLP

(57) ABSTRACT

Communication devices, communication systems and communication methods that implement transmission lane information are disclosed. In one example, circuitry is configured to receive transmission lane information from each of a plurality of reception lanes and to generate physical lane correspondence information based on the received transmission lane information, wherein the transmission lane information identifies a plurality of transmission lanes of a device that transmitted the transmission lane information. The physical lane correspondence information indicates a correspondence relationship between the plurality of transmission lanes and the plurality of reception lanes.

10 Claims, 15 Drawing Sheets

(51) Int. Cl.
*H04L 7/04* (2006.01)
*H04B 10/077* (2013.01)

(56) References Cited

U.S. PATENT DOCUMENTS

| | | | |
|---|---|---|---|
| 7,756,123 B1 | 7/2010 | Huang et al. | |
| 2008/0226029 A1* | 9/2008 | Weir | A61B 1/07 378/65 |
| 2009/0198958 A1* | 8/2009 | Arimilli | H04L 45/06 712/29 |
| 2010/0040370 A1* | 2/2010 | Aoki | H04J 3/0605 398/58 |
| 2010/0142525 A1* | 6/2010 | Cho | H04J 3/1652 370/389 |
| 2010/0229067 A1* | 9/2010 | Ganga | H03M 5/145 714/752 |
| 2013/0259478 A1* | 10/2013 | Komaki | H04B 10/516 398/58 |
| 2014/0006677 A1* | 1/2014 | Iyer | G06F 13/4291 710/316 |

FOREIGN PATENT DOCUMENTS

| | | |
|---|---|---|
| JP | 2001-350059 A | 12/2001 |
| JP | 2005-182485 A | 7/2005 |
| JP | 2011-211532 A | 10/2011 |
| JP | 2013-012879 A | 1/2013 |
| WO | WO-2008/053858 A2 | 5/2008 |
| WO | WO-2013/125621 A1 | 8/2013 |

\* cited by examiner

[FIG. 1]
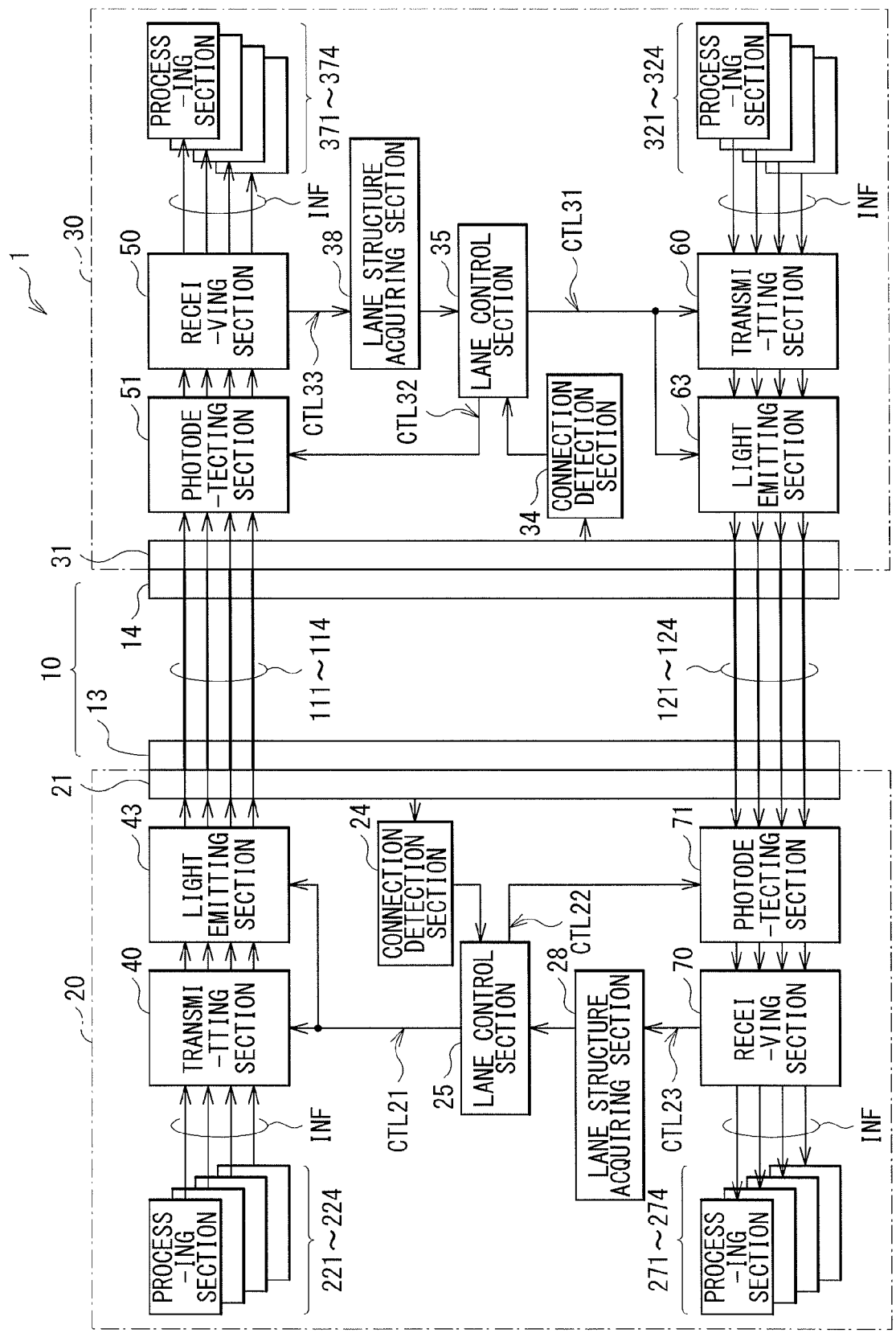

[FIG. 2]
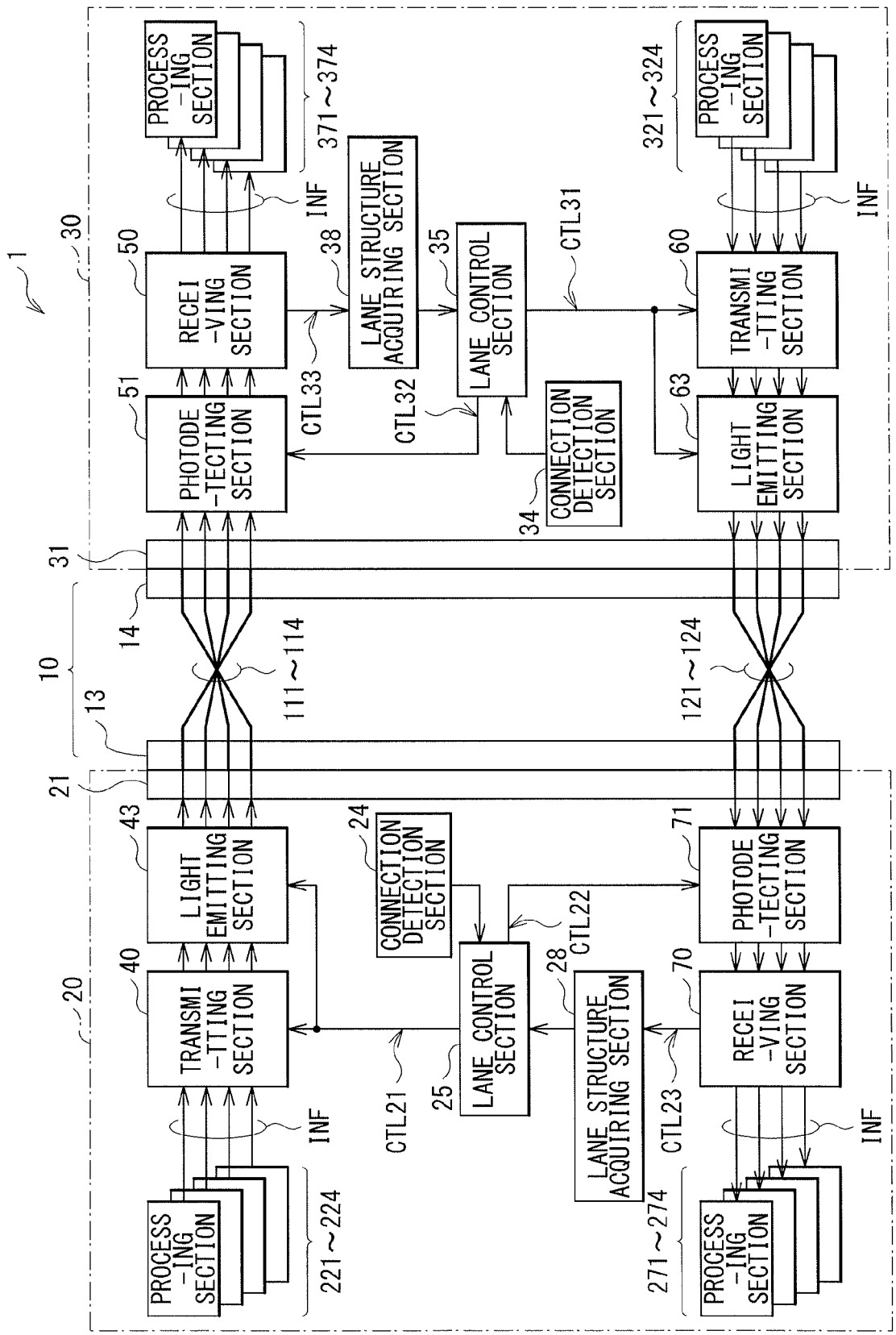

[ FIG. 3 ]
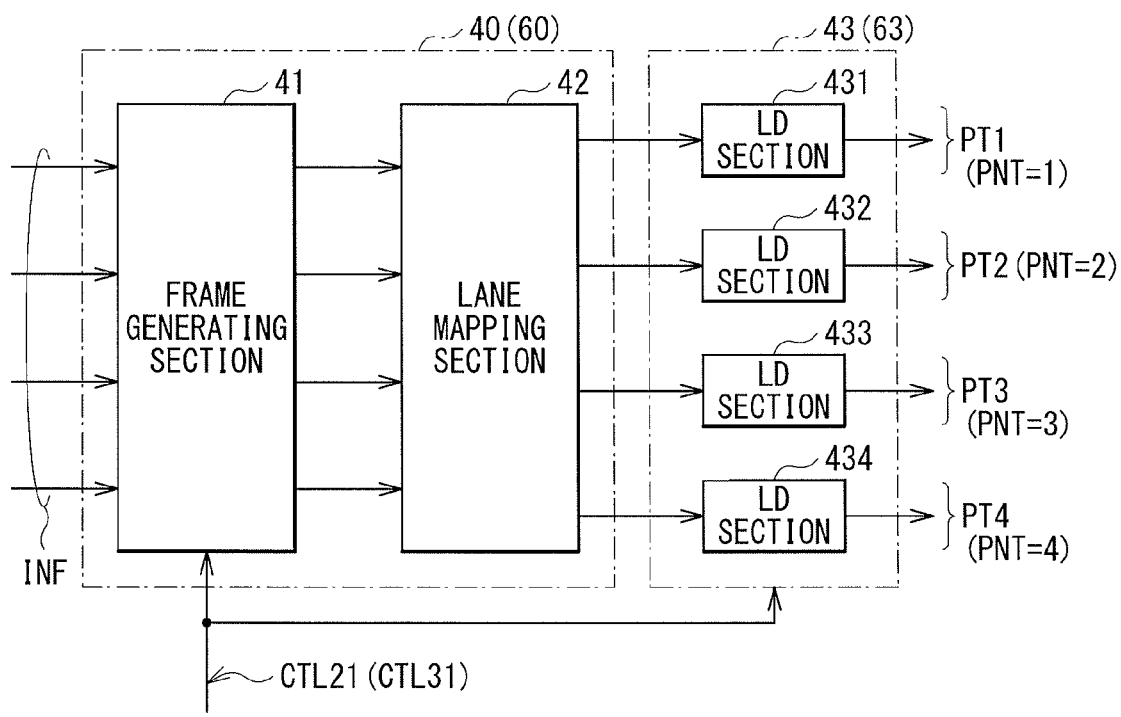
[ FIG. 4 ]
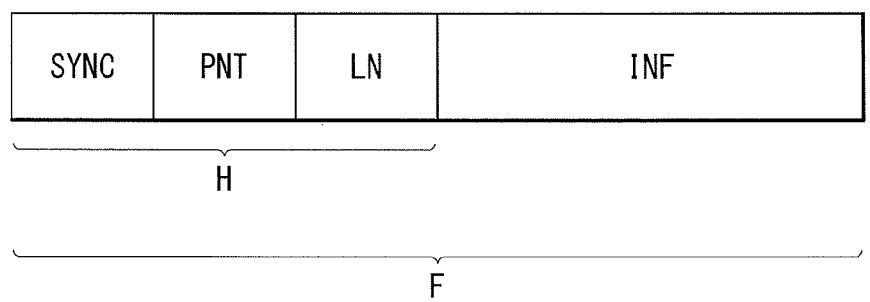

[ FIG. 5 ]
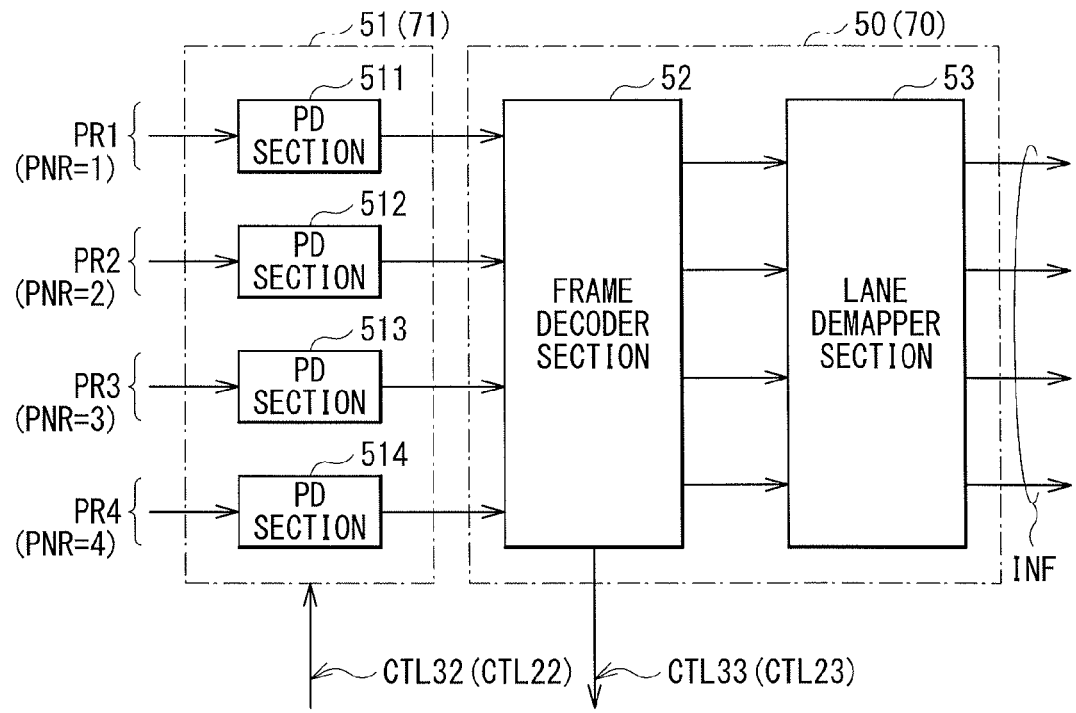
[ FIG. 6 ]
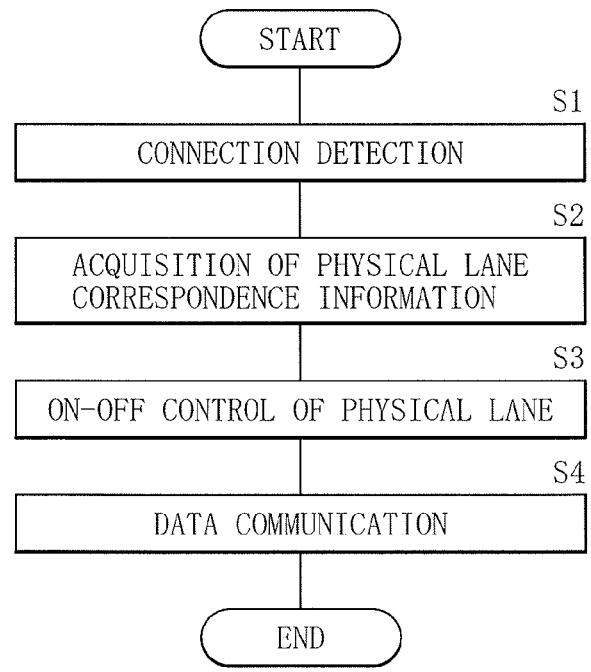

[ FIG. 7 ]

| PNT | 1 | 2 | 3 | 4 |
|---|---|---|---|---|
| STATUS | OK | OK | OK | OK |

[ FIG. 8 ]

| SYNC | PNT | LN | INF | |
|---|---|---|---|---|
| SYNC | 1 | 0 | TL1 | ~Fpre1 |
| SYNC | 2 | 0 | TL1 | ~Fpre2 |
| SYNC | 3 | 0 | TL1 | ~Fpre3 |
| SYNC | 4 | 0 | TL1 | ~Fpre4 |

| PNT | 1 | 2 | 3 | 4 |
|---|---|---|---|---|
| PNR | 1 | 2 | 3 | 4 |

[ FIG. 9B ]

| PNT | 1 | 2 | 3 | 4 |
|---|---|---|---|---|
| PNR | 4 | 3 | 2 | 1 |

[ FIG. 10 ]

| SYNC | PNT | LN | INF | |
|---|---|---|---|---|
| SYNC | 1 | 0 | TBL1 | ~Fpre11 |
| SYNC | 2 | 0 | TBL1 | ~Fpre12 |
| SYNC | 3 | 0 | TBL1 | ~Fpre13 |
| SYNC | 4 | 0 | TBL1 | ~Fpre14 |

H

[ FIG. 11A ]
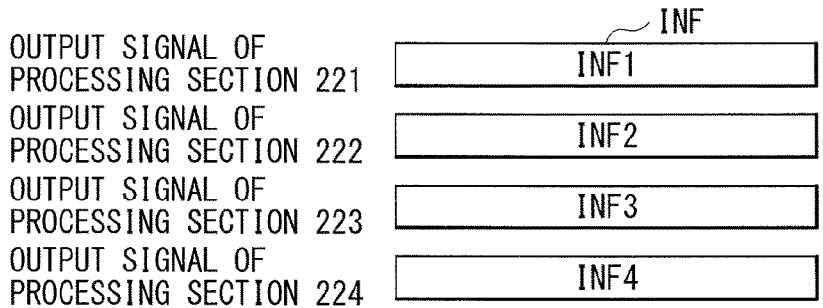
[ FIG. 11B ]
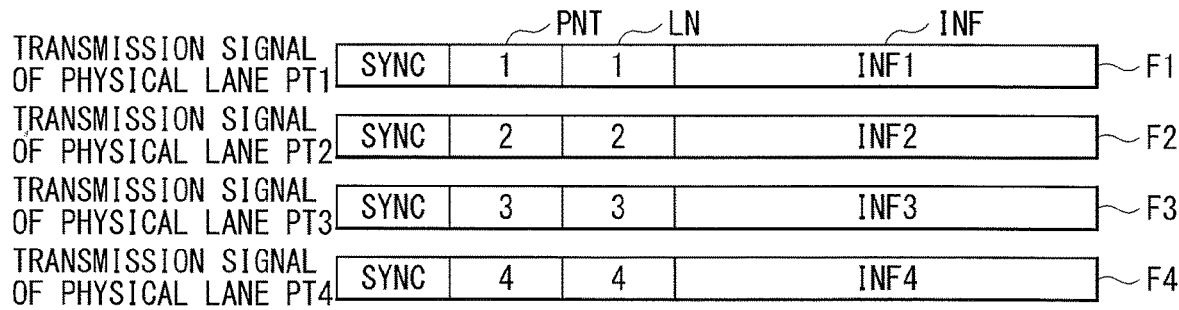
[ FIG. 11C ]
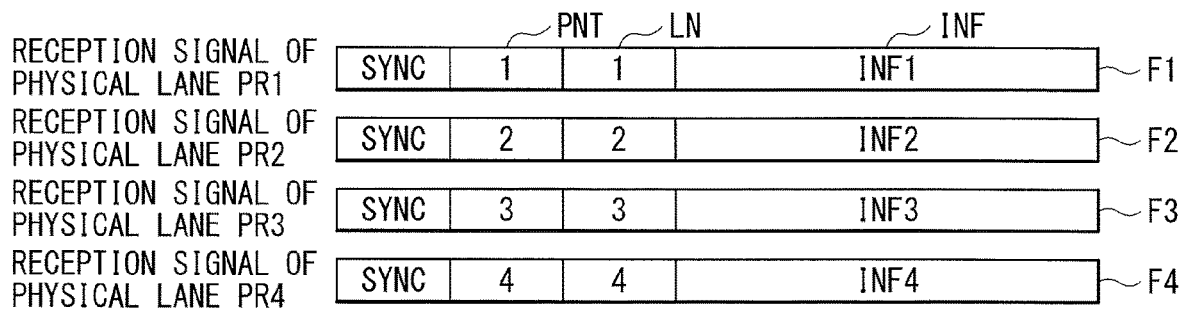
[ FIG. 11D ]
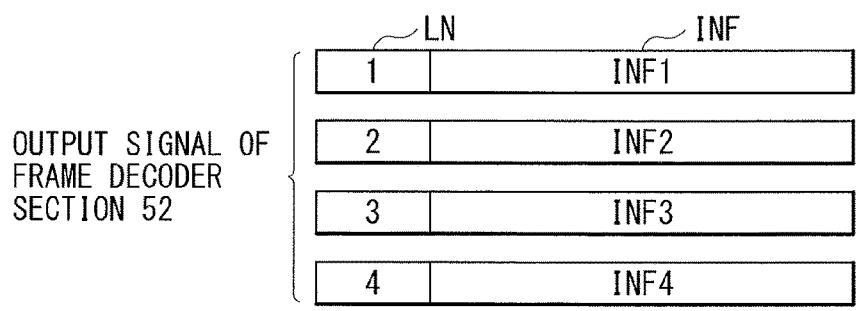

[ FIG. 11E ]
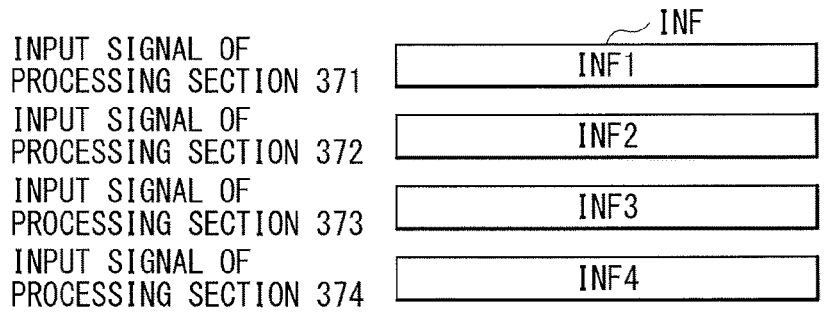
[ FIG. 12A ]
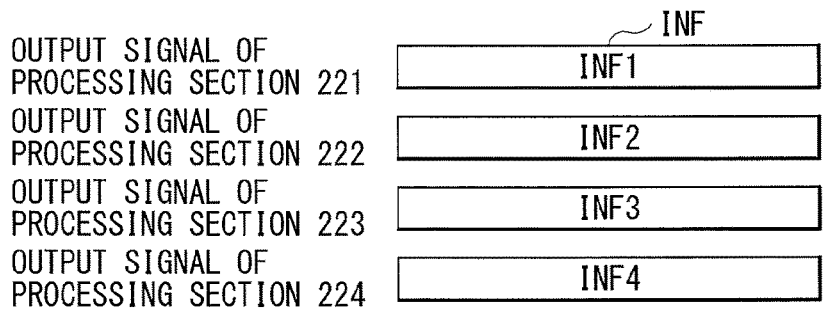
[ FIG. 12B ]
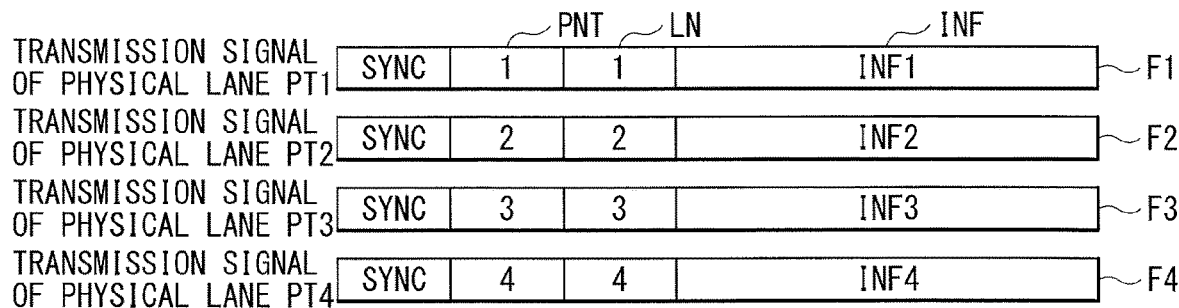
[ FIG. 12C ]
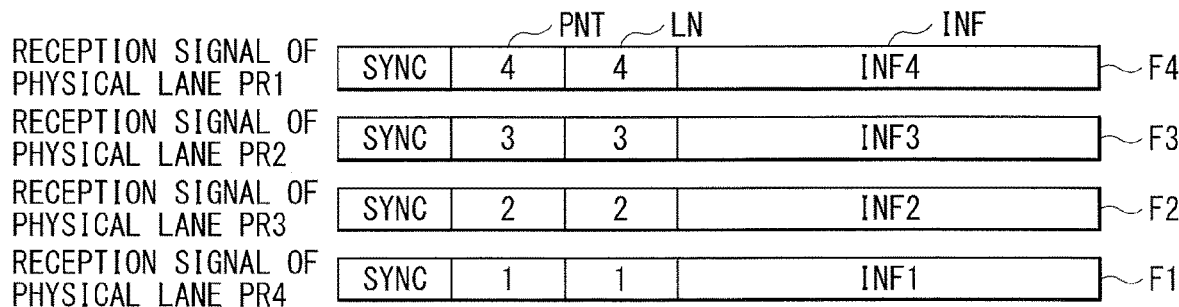

[ FIG. 12D ]
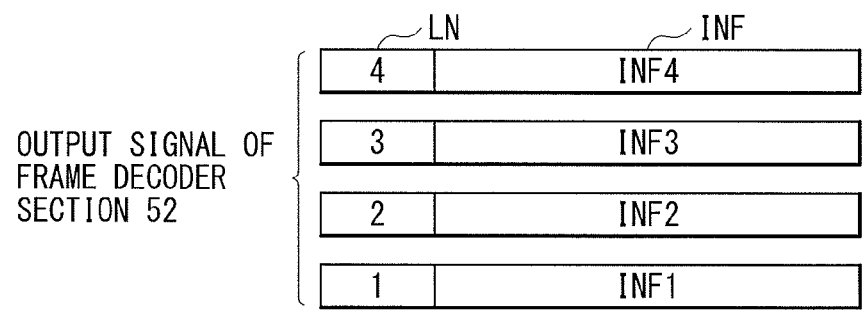
[ FIG. 12E ]
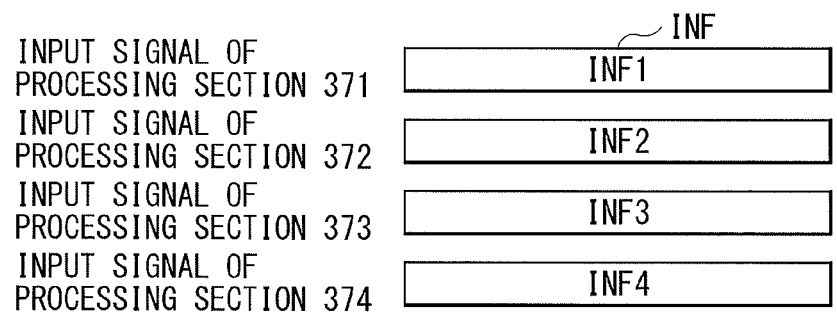

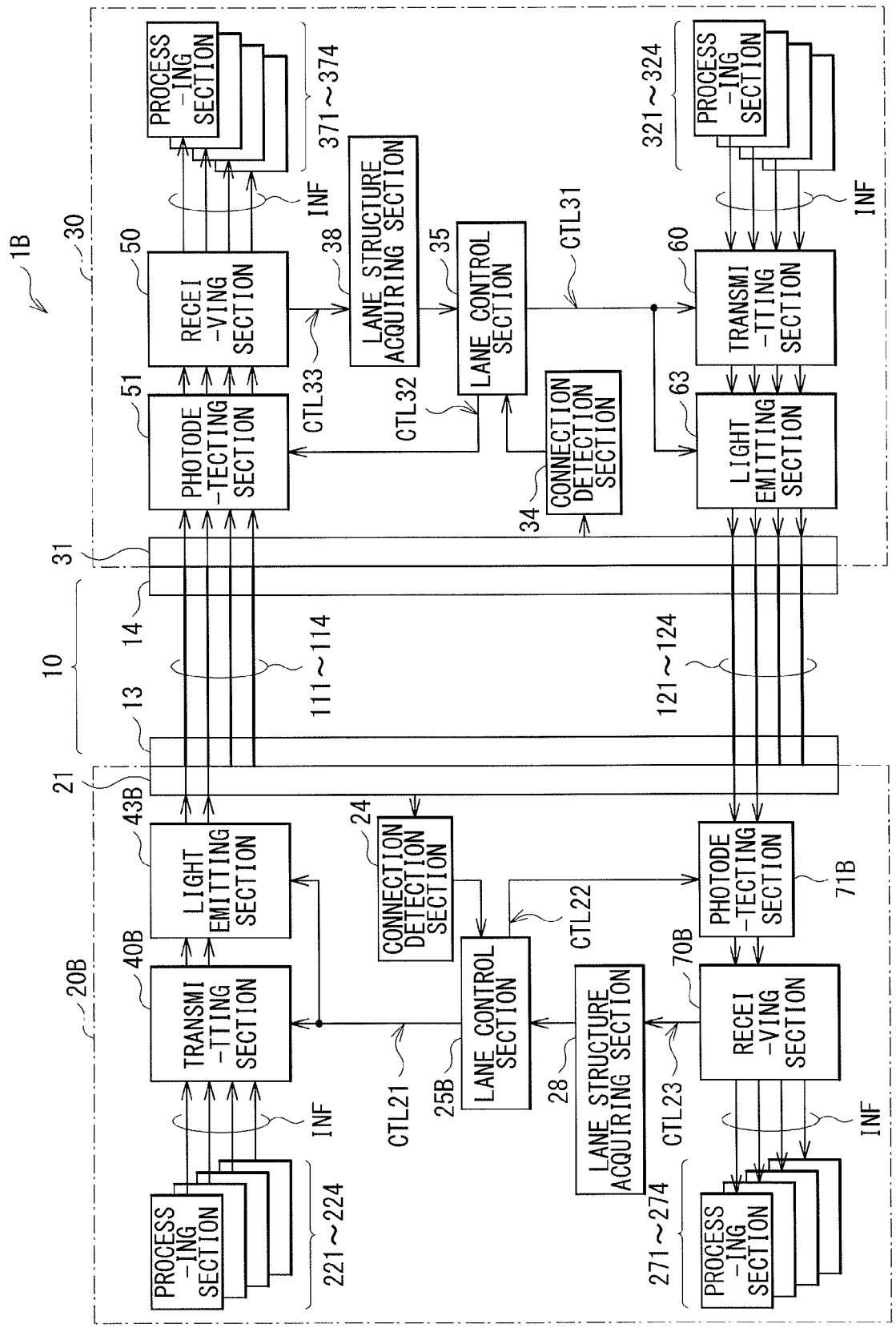
[FIG. 13]

[ FIG. 14 ]
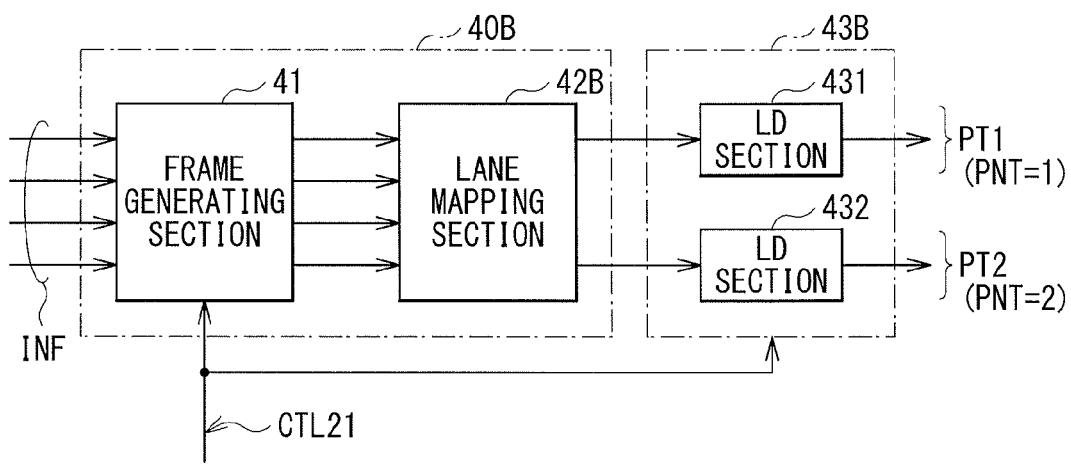
[ FIG. 15 ]
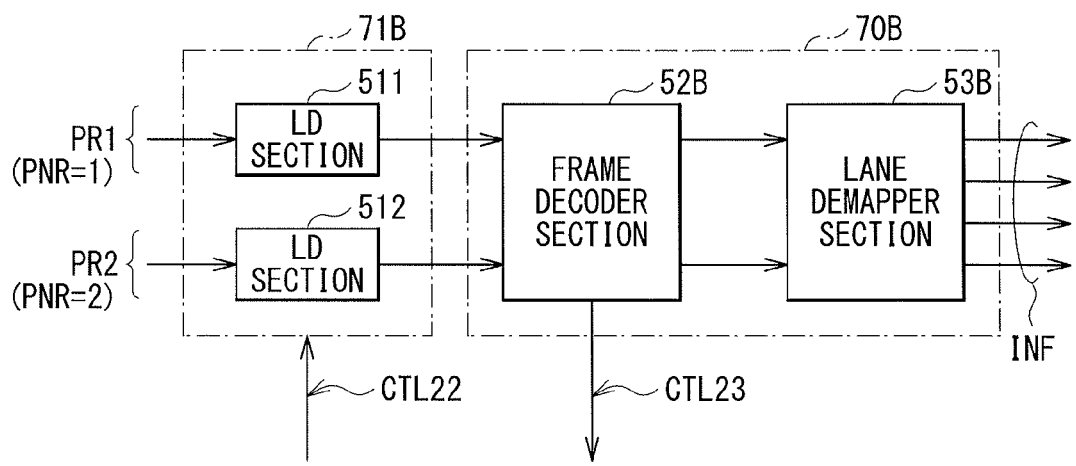

[ FIG. 16 ]

| PNT | 1 | 2 | 3 | 4 |
|---|---|---|---|---|
| STATUS | OK | OK | NG | NG |

[ FIG. 17 ]

| PNT | 1 | 2 |
|---|---|---|
| PNR | 1 | 2 |

[ FIG. 18 ]

| PNT | 1 | 2 | 3 | 4 |
|---|---|---|---|---|
| PNR | 1 | 2 | | |

[ FIG. 19 ]
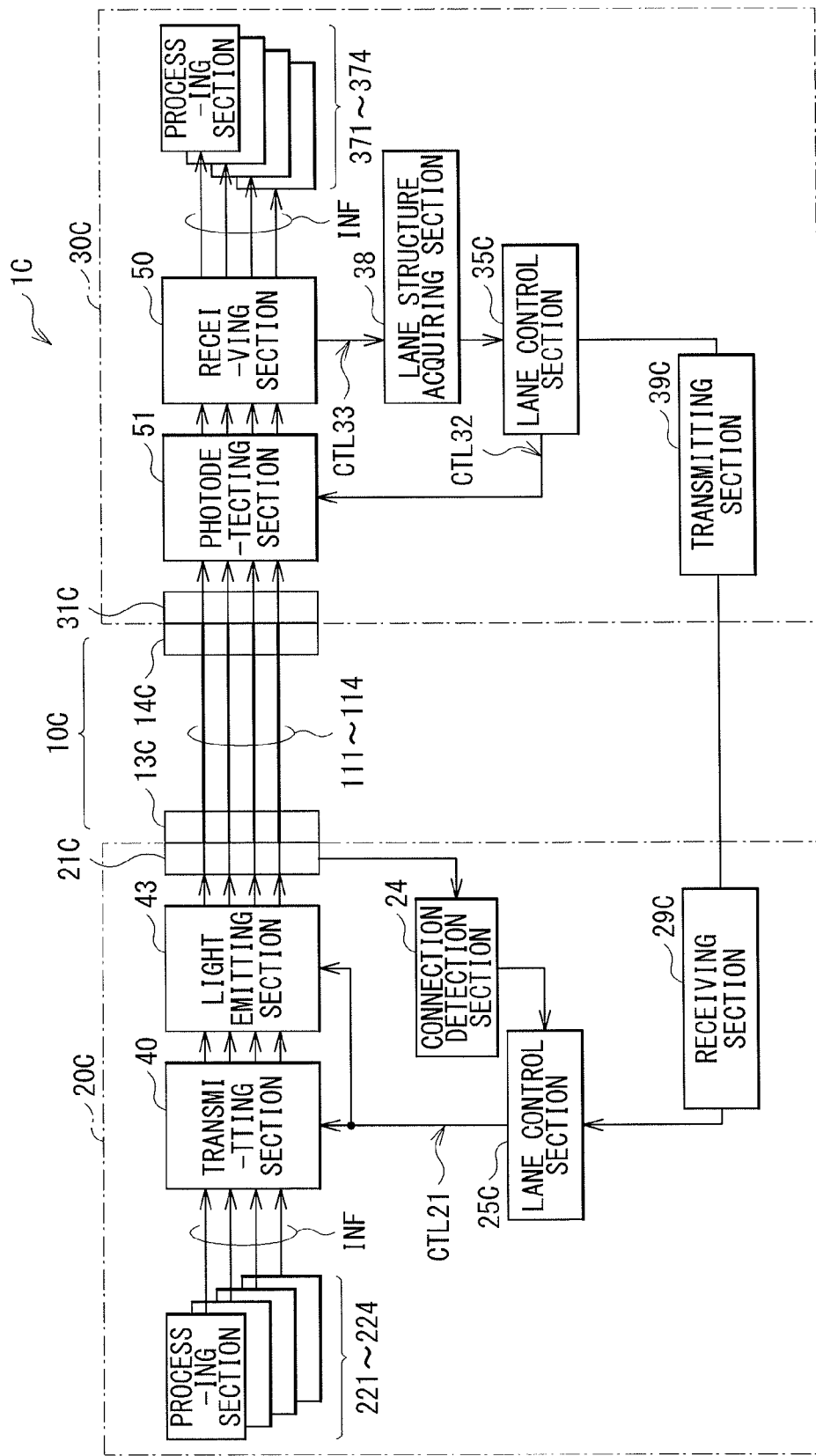

[ FIG. 20 ]
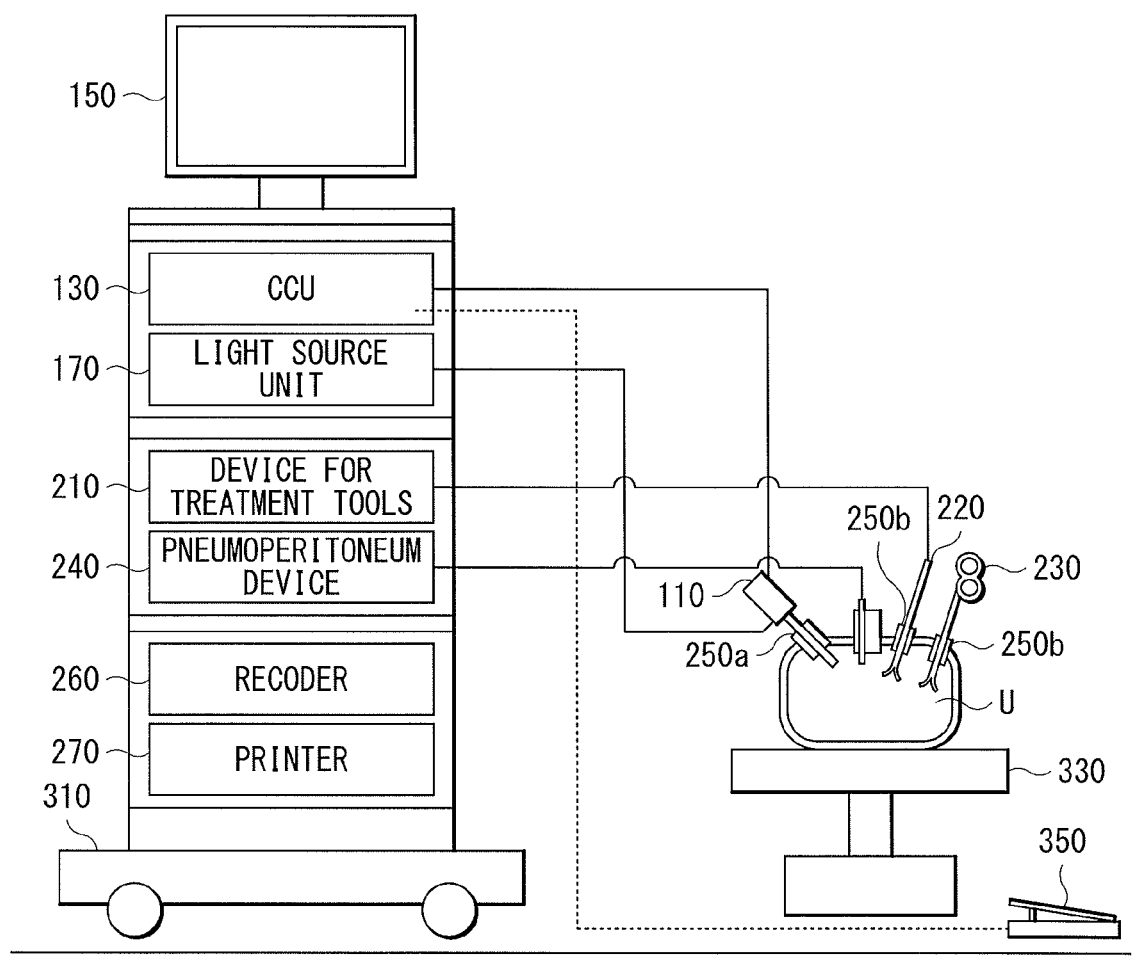

COMMUNICATION DEVICE, COMMUNICATION SYSTEM, COMMUNICATION METHOD, AND SURGICAL SYSTEM

CROSS REFERENCE TO RELATED APPLICATIONS

This application claims the benefit of Japanese Priority Patent Application JP 2015-064081 filed Mar. 26, 2015, the entire contents of which are incorporated herein by reference.

TECHNICAL FIELD

The present disclosure relates to a communication unit configured to exchange data, a communication system including such a communication unit, and a communication method used in such a communication system.

BACKGROUND ART

In association with high functionality and multi-functionality of an electronic apparatus in recent years, an amount of information to be exchanged between electronic apparatuses is increased. For example, the electronic apparatus is connected with other electronic apparatuses through wired communication. In the case of exchanging a lot of pieces of data, an optical fiber is often used in the wired communication.

In a communication system performing wired communication, it is necessary for a user to handle a cable, and high usability is thus desired. For example, in PTL 1, a reversible connector adapted to connect two optical fibers is disclosed.

CITATION LIST

Patent Literature

PTL 1: JP-A 2001-350059

SUMMARY

Technical Problem

As described above, high usability is desired in the communication system, and further improvement of usability is expected also in a communication unit used in such a communication system.

It is desirable to provide a communication unit, a communication system, and a communication method that are adapted to enhance usability of a user.

Solution to Problem

In one example, circuitry is configured to receive transmission lane information from each of a plurality of reception lanes and to generate physical lane correspondence information based on the received transmission lane information, wherein the transmission lane information identifies a plurality of transmission lanes of a device that transmitted the transmission lane information. The physical lane correspondence information indicates a correspondence relationship between the plurality of transmission lanes and the plurality of reception lanes. According to an alternative embodiment of the disclosure, there is provided a communication unit (1) including: a transmitting section configured to supply first lane information to each of a predetermined number of transmission lanes, the first lane information including a predetermined number of transmission lane identifiers corresponding to the predetermined number of respective transmission lanes.

According to an embodiment of the disclosure, there is provided a communication unit (2) including: a receiving section configured to receive first lane information from a first reception lane of a predetermined number of reception lanes, the first lane information including a predetermined number of transmission lane identifiers corresponding to a predetermined number of respective transmission lanes in a communication partner.

According to an embodiment of the disclosure, there is provided a communication system including: a first communication unit including a transmitting section that supplies first lane information to each of a predetermined number of transmission lanes, the first lane information including a predetermined number of transmission lane identifiers corresponding to the predetermined number of respective transmission lanes, the predetermined number of transmission lanes corresponding to a first predetermined number of communication lanes out of a plurality of communication lanes; and a second communication unit including a receiving section that receives the first lane information from a first reception lane of a predetermined number of reception lanes, the predetermined number of reception lanes corresponding to a second predetermined number of communication lanes out of the plurality of communication lanes.

According to an embodiment of the disclosure, there is provided a communication method including: supplying first lane information to each of a predetermined number of transmission lanes corresponding to a first predetermined number of communication lanes out of a plurality of communication lanes, the first lane information including a predetermined number of transmission lane identifiers that correspond to the predetermined number of respective transmission lanes; and receiving the first lane information from a first reception lane of a predetermined number of reception lanes corresponding to a second predetermined number of communication lanes out of the plurality of communication lanes.

In the communication unit (1) and the communication system according to the respective embodiments of the disclosure, the first lane information is supplied to each of the predetermined number of transmission lanes. The first lane information includes the predetermined number of transmission lane identifiers corresponding to the predetermined number of respective transmission lanes.

In the communication unit (2) and the communication system according to the respective embodiments of the disclosure, the first lane information is supplied from the first reception lane of the predetermined number of reception lanes. The first lane information includes the predetermined number of transmission lane identifiers corresponding to the predetermined number of respective transmission lanes in the communication partner.

In the communication method according to the embodiment of the disclosure, the first lane information including the predetermined number of transmission lane identifiers is supplied to each of the predetermined number of transmission lanes. The first lane information is then supplied from the first reception lane of the predetermined number of reception lanes.

Advantageous Effects of Invention

According to the communication unit (1) and the communication system of certain respective embodiments of the disclosure, the first lane information including the predetermined number of transmission lane identifiers is supplied to each of the predetermined number of transmission lanes, which makes it possible to enhance usability of a user.

According to the communication unit (2) and the communication system according to the respective embodiments of the disclosure, the first lane information including the predetermined number of transmission lane identifiers is received from the first reception lane of the predetermined number of reception lanes, which makes it possible to enhance usability of a user.

According to the communication method of an embodiment of the disclosure, the first lane information including the predetermined number of transmission lane identifiers is supplied to each of the predetermined number of transmission lanes, and the first lane information is received from the first reception lane of the predetermined number of reception lanes. This makes it possible to enhance usability of a user.

Note that effects described here are non-limiting. Effects achieved by the technology may be one or more of effects described in the present disclosure. It is to be understood that both the foregoing general description and the following detailed description are exemplary, and are provided to provide further explanation of the technology as claimed.

BRIEF DESCRIPTION OF DRAWINGS

The accompanying drawings are included to provide a further understanding of the technology, and are incorporated in and constitute a part of this specification. The drawings illustrate embodiments and, together with the specification, serve to explain the principles of the technology.

FIG. 1 is a block diagram illustrating a configuration example of a communication system according to an embodiment of the disclosure.

FIG. 2 is a block diagram illustrating another connection state of the communication system illustrated in FIG. 1.

FIG. 3 is a block diagram illustrating a configuration example of a transmitting section and a light emitting section illustrated in FIG. 1.

FIG. 4 is an explanatory diagram illustrating a structure example of a frame.

FIG. 5 is a block diagram illustrating a configuration example of a photodetecting section and a receiving section illustrated in FIG. 1.

FIG. 6 is a flow chart illustrating an operation example of the communication system illustrated in FIG. 1.

FIG. 7 is a table illustrating an example of transmission lane information in the communication system illustrated in FIG. 1.

FIG. 8 is an explanatory diagram illustrating an operation example of the communication system illustrated in FIG. 1.

FIG. 9A is a table illustrating an example of physical lane correspondence information in the communication system illustrated in FIG. 1.

FIG. 9B is a table illustrating another example of the physical lane correspondence information in the communication system illustrated in FIG. 2.

FIG. 10 is another explanatory diagram illustrating an operation example of the communication system illustrated in FIG. 1.

FIG. 11A is still another explanatory diagram illustrating an operation example of the communication system illustrated in FIG. 1.

FIG. 11B is still another explanatory diagram illustrating an operation example of the communication system illustrated in FIG. 1.

FIG. 11C is still another explanatory diagram illustrating an operation example of the communication system illustrated in FIG. 1.

FIG. 11D is still another explanatory diagram illustrating an operation example of the communication system illustrated in FIG. 1.

FIG. 11E is still another explanatory diagram illustrating an operation example of the communication system illustrated in FIG. 1.

FIG. 12A is another explanatory diagram illustrating an operation example of the communication system illustrated in FIG. 2.

FIG. 12B is still another explanatory diagram illustrating an operation example of the communication system illustrated in FIG. 2.

FIG. 12C is still another explanatory diagram illustrating an operation example of the communication system illustrated in FIG. 2.

FIG. 12D is still another explanatory diagram illustrating an operation example of the communication system illustrated in FIG. 2.

FIG. 12E is still another explanatory diagram illustrating an operation example of the communication system illustrated in FIG. 2.

FIG. 13 is a block diagram illustrating a configuration example of a communication system according to a modification.

FIG. 14 is a block diagram illustrating a configuration example of a transmitting section and a light emitting section illustrated in FIG. 13.

FIG. 15 is a block diagram illustrating a configuration example of a photodetecting section and a receiving section illustrated in FIG. 13.

FIG. 16 is a table illustrating an example of transmission lane information in the communication system illustrated in FIG. 13.

FIG. 17 is a table illustrating an example of physical lane correspondence information in the communication system illustrated in FIG. 13.

FIG. 18 is a table illustrating an example of another physical correspondence information in the communication system illustrated in FIG. 13.

FIG. 19 is a block diagram illustrating a configuration example of a communication system according to another modification.

FIG. 20 is an explanatory diagram illustrating an example of a schematic configuration of a surgery system to which the communication system according to the embodiment of the disclosure is applied.

DESCRIPTION OF EMBODIMENTS

Figure 21:
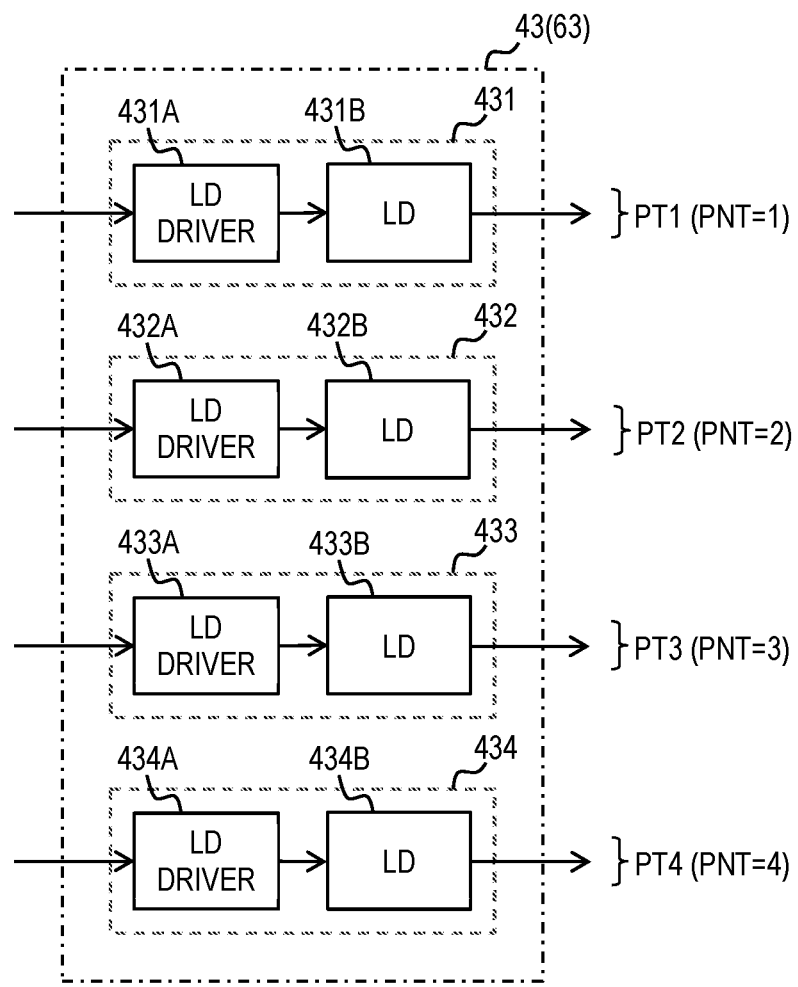
FIG. 21 is a block diagram illustrating a configuration example of the light emitting section in the communication system illustrated in FIG. 1.

An embodiment of the disclosure will be described in detail below with reference to drawings.

Embodiment

Configuration Example

FIG. 1 illustrates a configuration example of a communication system (a communication system 1) according to an embodiment of the disclosure. The communication system 1 is an optical communication system including a plurality of communication lanes. Note that the communication unit and the communication method according to the respective embodiments of the disclosure are implemented by the present embodiment, and description thereof is therefore given together. The communication system 1 includes an optical cable 10, a communication unit 20, and a communication unit 30.

The optical cable 10 includes eight optical fibers 111 to 114 and 121 to 124 and connectors 13 and 14. The optical fibers 111 to 114 each transmit an optical signal from the communication unit 20 to the communication unit 30, and the optical fibers 121 to 124 each transmit an optical signal from the communication unit 30 to the communication unit 20. The connector 13 is provided at a first end of the optical cable 10 and is coupled to a connector 21 of the communication unit 20. Although not illustrated, the connector 13 includes symmetrically-disposed four terminals for the optical fibers 111 to 114 and symmetrically-disposed four terminals for the optical fibers 121 to 124. The connector 13 is accordingly adapted to be reversibly coupled to the connector 21 of the communication unit 20. The connector 14 is provided at a second end of the optical cable 10, and is coupled to a connector 31 of the communication unit 30. Although not illustrated, the connector 14 includes symmetrically-disposed four terminals for the optical fibers 111 to 114 and symmetrically-disposed four terminals for the optical fibers 121 to 124. The connector 14 is accordingly adapted to be reversibly coupled to the connector 31 of the communication unit 30.

FIG. 2 illustrates an example of the communication system 1 in another connection state. Since the optical cable 1 is able to be reversibly connected to the communication units 20 and 30 in the communication system 1, a pair of terminals intended to be mutually connected of the communication units 20 and 30 are not uniquely determined as illustrated in FIG. 1. As will be described later, the communication system 1 is adapted to exchange data correctly even in such a case. This allows a user to connect the optical cable 10 to the communication units 20 and 30 irrespective of directions of the connectors in the communication system 1, which makes it possible to enhance usability of the user.

(Data Communication from Communication Unit 20 to Communication Unit 30)

Components of each of the communication units 20 and 30 are described with focusing on data communication from the communication unit 20 to the communication unit 30. The communication unit 20 includes the connector 21, processing sections 221 to 224, a transmitting section 40, a light emitting section 43, a connection detection section 24, and a lane control section 25. The communication unit 30 includes the connector 31, a photodetecting section 51, a receiving section 50, processing sections 371 to 374, a lane structure acquiring section 38, and a lane control section 35.

The connector 21 of the communication unit 20 is configured to be coupled to the connector 13 of the optical cable 10.

The processing sections 221 to 224 are information sources each generating data INF. The processing sections 221 to 224 are assigned with a logical lane number LN (LN: 1 to 4) different from one another. The processing sections 221 to 224 each supply the generated data INF to the transmitting section 40. Incidentally, although the four processing sections 221 to 224 are provided in this example, the number of processing sections is not limited thereto, and three or less or five or more processing sections may be provided.

The transmitting section 40 generates four transmission signals, based on the data INF and supplies the four transmission signals to the light emitting section 43. The light emitting section 43 generates four optical signals, based on the four transmission signals or four electric signals supplied from the transmitting section 40, and transmits the four optical signals to the communication unit 30 through the respective optical fibers 111 to 114.

FIG. 3 illustrates a configuration example of the transmitting section 40 and the light emitting section 43. The light emitting section 43 includes four laser diode (LD) sections 431 to 434 each converting an electric signal into an optical signal. Each of the LD sections 431 to 434 may include, for example, a laser diode only or may include, for example, each of LD drivers 431A to 434A and each of laser diodes 431B to 434B illustrated in FIG. 21, and is set to one of ON state and OFF state, based on a signal CTL21. The four LD sections 431 to 434 correspond to physical lanes PT1 to PT4, respectively. The physical lanes PT1 to PT4 are assigned with physical lane number PNT from 1 to 4, respectively. Hereinafter, a physical lane PT is appropriately used to represent one of the physical lanes PT1 to PT4.

The transmitting section 40 includes a frame generating section 41 and a lane mapping section 42.

The frame generating section 41 generates a frame F, based on the data INF and the signal CTL21 that is supplied from the lane control section 25.

FIG. 4 illustrates a structure example of the frame F. The frame F includes a header H and the data INF. The header H includes synchronization information SYNC, the physical lane number PNT, and a logical lane number LN. The synchronization information SYNC, the physical lane number PNT, and the logical lane number LN are arranged in this order in the header H. The synchronization information SYNC is arranged at a head of the frame F, and allows the delimiter of the frame F in a series of stream to be identified. The physical lane number PNT corresponds to the physical lane PT to be used in transmission of the frame F out of the physical lanes PT1 to PT4. The logical lane number LN corresponds to the processing section that generates the data INF out of the processing sections 221 to 224.

When receiving the data INF, the frame generating section 41 generates the header H, and adds the header H to the data INF to generate the frame F. At this time, the frame generating section 41 selects the physical lane PT to be used from the physical lanes PT1 to PT4, based on the signal CTL21, and generates the header H with use of the physical lane number PNT corresponding to the selected physical lane PT. The frame generating section 41 then supplies the frame F to the lane mapping section 42.

The frame generating section 41 generates a frame F (hereinafter, also referred to as a frame Fpre) that includes transmission lane information TL1 in the data INF. The transmission lane information TL1 relates to the physical lane number PNT of the usable physical lane PT in the light emitting section 43. "The usable physical lane PT" may be, for example, the physical lane PT (the physical lanes PT1 to PT4 in this example) implemented in the light emitting section 43. The transmission lane information TL1 is supplied from the lane control section 25 with use of the signal CTL21. The frame generating section 41 then supplies the generated frame Fpre to the lane mapping section 42.

The lane mapping section 42 supplies the frame F to the physical lane PT corresponding to the physical lane number PNT out of the physical lanes PT1 to PT4 (the LD sections 431 to 434), based on the physical lane number PNT included in the frame F that is supplied from the frame generating section 41. Specifically, the lane mapping section 41 supplies the frame F to the physical lane PT1 (the LD section 431) when the physical lane number PNT included in the frame F is "1". The lane mapping section 42 supplies the frame F to the physical lane PT2 (the LD section 432) when the physical lane number PNT included in the frame F is "2". The lane mapping section 42 supplies the frame F to the physical lane PT3 (the LD section 433) when the physical lane number PNT included in the frame F is "3". The lane mapping section 42 supplies the frame F to the physical lane PT4 (the LD section 434) when the physical lane number PNT included in the frame F is "4".

The connection detection section 24 detects that the connector 13 of the optical table 10 is coupled to the connector 21, and informs the lane control section 28 of a detection result. The connection detection section 24 may mechanically detect connection of the connector 13 with the connector 21, or may detect that, for example, an optical signal can be exchanged between the communication unit 20 and the communication unit 30.

The lane control section 25 controls the transmitting operation in the transmitting section 40 and the light emitting section 43 with use of the signal CTL21. Specifically, the lane control section 25 controls the transmitting operation in the transmitting section 40 and the light emitting section 43, based on physical lane correspondence information TBL1 that indicates correspondence relationship between the physical lanes PT1 to PT4 in the light emitting section 43 of the communication unit 20 and physical lanes PR1 to PR4 (described later) in the photodetecting section 51 of the communication unit 30. The lane control section 25 also has a function of generating the transmission lane information TL1 and supplying the transmission lane information TL1 to the transmitting section 40 with use of the signal CTL21 in preparation operation before the data communication.

The connector 31 of the communication unit 30 is configured to be coupled to the connector 14 of the optical cable 10.

The photodetecting section 51 generates four reception signals or four electric signals, based on the four optical signals transmitted from the light emitting section 43 of the communication unit 20 through the optical fibers 111 to 114. The receiving section 50 receives the frame F, based on the four reception signals supplied from the photodetecting section 51.

Figure 22:
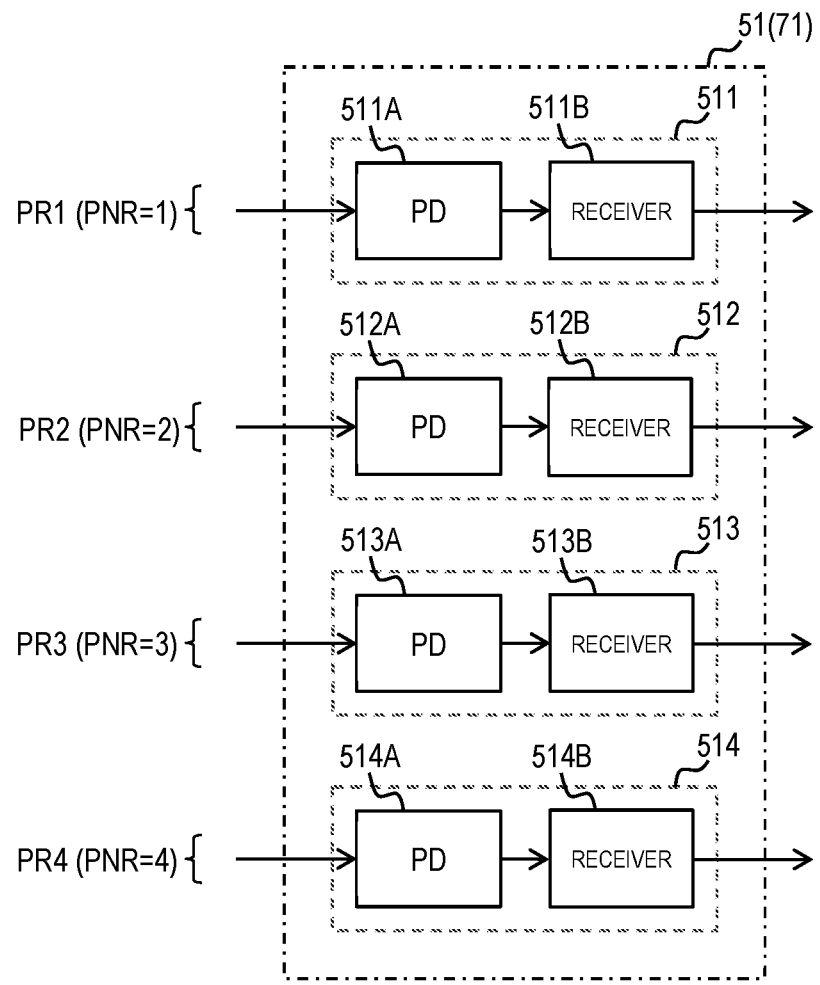
FIG. 22 is a block diagram illustrating a configuration example of the photodetecting section in the communication system illustrated in FIG. 1.

FIG. 5 illustrates a configuration example of the photodetecting section 51 and the receiving section 50. The photodetecting section 51 includes four photodiode (PD) sections 511 to 514 each converting an optical signal into an electric signal. Each of the PD sections 511 to 514 may include, for example, a photodiode, a laser diode only or may include, for example, each of laser diodes 511A to 514A and each of receivers 511B to 514B illustrated in FIG. 22, and is set to one of ON state and OFF state, based on a signal CTL32. The PD sections 511 to 514 correspond to the physical lanes PR1 to PR4, respectively. The physical lanes PR1 to PR4 are assigned with physical lane number PNR from 1 to 4, respectively. Hereinafter, a physical lane PR is appropriately used to represent one of the physical lanes PR1 to PR4.

The receiving section 50 includes a frame decoder section 52 and a lane demapper section 53.

The frame decoder section 52 removes the synchronization information SYNC and the physical lane number PNT from the frame F included in the reception signal supplied from the photodetecting section 51, and supplies a remaining part, i.e., the logical lane number LN and the data INF, to the lane demapper section 53. The frame decoder section 52 also supplies, to the lane structure acquiring section 38, the transmission lane information TL1 included in the data INF of the frame Fpre, the physical lane number PNT included in the header H of the frame Fpre, and the physical lane number PNR of the physical lane PR that has received the frame Fpre, with use of the signal CTL33, in the preparation operation before the data communication.

The lane demapper section 53 supplies the data INF to the processing section assigned to the logical lane number LN out of the processing section 371 to 374, based on the logical lane number LN added to the data INF.

The processing sections 371 to 374 each receive the data INF. The processing sections 371 to 374 are assigned with a logical lane number LN (LN: 1 to 4) different from one another. The processing sections 371 to 374 each perform predetermined processing, based on the received data INF. Incidentally, although the four processing sections 371 to 374 are provided in this example, the number of the processing sections is not limited thereto, and three or less or five or more processing sections may be provided.

The lane structure acquiring section 38 generates the physical lane correspondence information TBL1 in the preparation operation before the data communication. Specifically, the lane structure acquiring section 38 first receives, from the frame decoder section 52, the transmission lane information TL1 included in the frame Fpre, the physical lane number PNT included in the header H of the frame Fpre, and the physical lane number PNR of the physical lane PR that has received the frame Fpre. The lane structure acquiring section 38 then generates the physical lane correspondence information TBL1 that indicates correspondence relationship between the physical lanes PT1 to PT4 in the light emitting section 43 of the communication unit 20 and the physical lanes PR1 to PR4 in the photodetecting section 51 of the communication unit 30, based on these information. The lane structure acquiring section 38 then supplies the generated physical lane correspondence information TBL1 to the lane control section 35.

The lane control section 35 controls receiving operation in the photodetecting section 51 with use of the signal CTL32, based on the physical lane correspondence information TBL1. The lane control section 35 also has a function of supplying the physical lane correspondence information TBL1 to the lane control section 25 of the communication unit 20 through a transmitting section 60 (described later), a light emitting section 63 (described later), the optical fibers 121 to 124, a photodetecting section 71 (described later), a receiving section 70 (described later), and a lane structure acquiring section 28 (described later), in the preparation operation before the data communication.

(Data Communication from Communication Unit 30 to Communication Unit 20)

Components of each of the communication units 20 and 30 are described with focusing on the data communication from the communication unit 30 to the communication unit 20. The communication unit 30 includes processing sections 321 to 324, the transmitting section 60, the light emitting section 63, and a connection detection section 34. The communication unit 20 includes the photodetecting section 71, the receiving section 70, processing sections 271 to 274, and the lane structure acquiring section 28.

The processing sections 321 to 324 are information sources each generating the data INF similarly to the processing sections 221 to 224 of the communication unit 20. The transmitting section 60 has a configuration similar to that of the transmitting section 40 of the communication unit 20 and the light emitting section 63 has a configuration similar to that of the light emitting section 43 of the communication unit 20, as illustrated in FIG. 3. The transmitting section 60 and the light emitting section 63 generate optical signals, based on the data INF, and transmits the optical signals to the communication unit 20 through the optical fibers 121 to 124. The frame generating section 41 of the transmitting section 60 generates the frame Fpre in the preparation operation before the data communication. The frame Fpre includes, in the data INF, transmission lane information TL2 relating to the physical lane number PNT of the physical lane PT usable in the light emitting section 63. The connection detection section 34 detects that the connector 14 of the optical cable 10 is coupled to the connector 31, and informs the lane control section 35 of a detection result.

The lane control section 35 has a function of controlling the transmitting operation in the transmitting section 60 and the light emitting section 63 with use of the signal CTL31. Specifically, the lane control section 35 has a function of controlling the transmitting operation in the transmitting section 60 and the light emitting section 63, based on the physical lane correspondence information TBL2. The physical lane correspondence information TBL2 indicates correspondence relationship between the physical lanes PT1 to PT4 in the light emitting section 63 of the communication unit 30 and the physical lanes PR1 to PR4 (described later) in the photodetecting section 71 of the communication unit 20. The lane control section 35 also has a function of generating the transmission lane information TL2 and supplying the transmission lane information TL2 to the transmitting section 60 with use of the signal CTL31, in the preparation operation before the data communication.

As illustrated in FIG. 5, the photodetecting section 71 of the communication unit 20 has a configuration similar to that of the photodetecting section 51 of the communication unit 30, and the receiving section 70 of the communication unit 20 has a configuration similar to that of the receiving section 50 of the communication unit 30. The photodetecting section 71 and the receiving section 70 receive the optical signals transmitted from the communication unit 30 through the optical fibers 121 to 124, to receive the frame F. The frame decoder section 52 of the receiving section 70 supplies, to the lane structure acquiring section 28, the transmission lane information TL2 included in the data INF of the frame Fpre, the physical lane number PNT included in the header H of the frame Fpre, and the physical lane number PNR of the physical lane PR that has received the frame Fpre, with use of the signal CTL23, in the preparation operation before the data communication. The processing sections 271 to 274 receive the data INF, similarly to the processing sections 371 to 374 of the communication unit 30. The lane structure acquiring section 28 generates the physical lane correspondence information TBL2 in the preparation operation before the data communication, similarly to the lane structure acquiring section 38 of the communication unit 30.

The lane control section 25 also has a function of controlling the receiving operation in the photodetecting section 71 with use of the signal CTL22, based on the physical lane correspondence information TBL2. The lane control section 25 also has a function of supplying the physical lane correspondence information TBL2 to the lane control section 35 of the communication unit 30 through the transmitting section 40, the light emitting section 43, the optical fibers 111 to 114, the photodetecting section 51, the receiving section 50, and the lane structure acquiring section 38, in the preparation operation before the data communication.

In the communication unit 20, the processing sections 221 to 224, the transmitting section 40, the connection detection section 24, the lane control section 25, the receiving section 70, the processing section 271 to 274, and the lane structure acquiring section 28 may be integrated in, for example, a semiconductor chip. In the communication unit 30, the processing sections 321 to 324, the transmitting section 60, the connection detection section 34, the lane control section 35, the receiving section 50, the processing sections 371 to 374, and the lane structure acquiring section 38 may be integrated in, for example, a semiconductor chip.

The lane control sections 25 and 35 each correspond to a specific but non-limiting example of "transmission control section" in the disclosure. The lane control sections 25 and 35 and the lane structure acquiring sections 28 and 38 correspond to a specific but non-limiting example of "reception control section" in the disclosure. The physical lane PT corresponds to a specific but non-limiting example of "transmitting lane" in the disclosure. The physical lane number PNT corresponds to a specific but non-limiting example of "transmission lane identifier" in the disclosure. The physical lane PR corresponds to a specific but non-limiting example of "receiving lane" in the disclosure. The physical lane number PNR corresponds to a specific but non-limiting example of "receiving lane identifier" in the disclosure. The logical lane number LN corresponds to a specific but non-limiting example of "data identifier" in the disclosure. The transmission lane information TL1 and TL2 corresponds to a specific but non-limiting example of "first lane information". The physical lane correspondence information TBL1 and TBL2 correspond to a specific but non-limiting example of "second lane information" in the disclosure. The optical fibers 111 to 114 and 121 to 124 correspond to a specific but non-limiting example of "a plurality of communication lanes" in the disclosure.

(Operation and Action)

The operation and the action of the communication system 1 according to the present embodiment are described below.

(General Operation Outline)

General Operation Outline of the communication system 1 is described with reference to FIG. 1. The data communication from the communication unit 20 to the communication unit 30 is described below as an example. Note that the data communication from the communication unit 30 to the communication unit 20 is performed in a similar manner.

In the communication unit 20, the transmitting section 40 generates the frame Fpre that includes the transmission lane information TL1 in the data INF and transmits the frame Fpre to the communication unit 30 before the data communication. In the communication unit 30, the receiving section 50 receives the frame Fpre. The lane structure acquiring section 38 generates the physical lane correspondence information TBL1, based on the transmission lane information TL1 included in the data INF of the frame Fpre, the physical lane number PNT included in the header H of the frame Fpre, and the physical lane number PNR of the physical lane PR that has received the frame Fpre. The lane control section 35 supplies the physical lane correspondence information TBL1 to the lane control section 25 of the communication unit 20 through the optical fibers 121 to 124. The communication units 20 and 30 each accordingly acquire the physical lane correspondence information TBL1.

The communication unit 20 then starts the data communication to the communication unit 30. Specifically, in the communication unit 20, the lane control section 25 controls the transmitting operation in the transmitting section 40 and the light emitting section 43, based on the physical lane correspondence information TBL1. The transmitting section 40 then generates the frame F, based on the data INF supplied from the processing sections 221 to 224, and transmits the frame F to the communication unit 30. In the communication unit 30, the lane control section 35 controls the receiving operation in the photodetecting section 51, based on the physical lane correspondence information TBL1. The receiving section 50 then acquires the data INF, based on the received frame F, and supplies the data INF to the processing sections 371 to 374.

(Detailed Operation)

FIG. 6 illustrates a detailed operation in the communication system 1. The data communication from the communication unit 20 to the communication unit 30 is described below as an example. Note that the data communication from the communication unit 30 to the communication unit 20 is performed in a similar manner.

In the communication system 1, connection detection is performed first (step S1). The communication units 20 and 30 each then acquire the physical lane correspondence information TBL1 before the data communication (step S2). The communication units 20 and 30 perform ON-OFF control of the physical lanes PT1 to PT4 and PR1 to PR4, based on the physical lane correspondence information TBL1 (step S3). After that, the communication unit 20 performs the data communication on the communication unit 30 (step S4). This operation is described in detail below.

(Connection Detection)

The communication units 20 and 30 each perform the connection detection (step S1). Specifically, the connection detection section 24 of the communication unit 20 detects that the optical cable 10 has been connected to the communication unit 20, and informs the lane control section 25 of the detection result. Likewise, the connection detection section 34 of the communication unit 30 detects that the optical cable 10 has been connected to the communication unit 30, and informs the lane control section 35 of the detection result. Note that the process does not proceed to next step S2 when the optical cable 10 is not connected to one or both of the communication units 20 and 30.

(Acquisition of Physical Lane Correspondence Information)

The communication units 20 and 30 each then acquire the physical lane correspondence information (step S2).

Specifically, the lane control section 25 of the communication unit 20 first supplies the transmission lane information TL1 to the transmitting section 40 with use of the signal CTL21.

FIG. 7 illustrates a structure example of the transmission lane information TL1. In this example, as illustrated in FIG. 3, the four physical lanes PT1 to PT4 are implemented in the light emitting section 43. The four physical lanes PT1 to PT4 are thus usable in the light emitting section 43. The lane control section 25 accordingly generates the transmission lane information TL1 including the physical lane number PNT corresponding to the four physical lanes PT1 to PT4.

The frame generating section 41 of the transmitting section 40 generates the frame Fpre including the transmission lane information TL1 in the data INF, based on the transmission lane information TL1.

FIG. 8 illustrates a structure example of the frame Fpre that is generated by the frame generating section 41. In this example, the frame generating section 41 generates four frames Fpre1 to Fpre4. Specifically, the frame generating section 41 adds, to the data INF (the transmission lane information TL1), the synchronization information SYNC, the physical lane number PNT having the value "1", and the logical lane number LN having the value "0", to generate the frame Fpre1. Likewise, the frame generating section 41 adds, to the data INF (the transmission lane information TL1), the synchronization information SYNC, the physical lane number PNT having the value "2", and the logical lane number LN having the value "0", to generate the frame Fpre2. The frame generating section 41 adds, to the data INF (the transmission lane information TL1), the synchronization information SYNC, the physical lane number PNT having the value "3", and the logical lane number LN having the value "0", to generate the frame Fpre3. The frame generating section 41 adds, to the data INF (the transmission lane information TL1), the synchronization information SYNC, the physical lane number PNT having the value "4", and the logical lane number LN having the value "0", to generate the frame Fpre4. In other words, the frames Fpre1 to Fpre4 are different only in physical lane number PNT of the header H from one another.

The lane mapping section 42 supplies each of the frames Fpre1 to Fpre4 to the physical lane PT corresponding to the physical lane number PNT, based on the physical lane number PNT of the header H in each of the frames Fpre1 to Fpre4. Specifically, the lane mapping section 42 supplies the frame Fpre1 to the physical lane PT1, supplies the frame Fpre2 to the physical lane PT2, supplies the frame Fpre3 to the physical lane PT3, and supplies the frame Fpre4 to the physical lane PT4.

The transmitting section 40 of the communication unit 20 transmits the frames Fpre1 to Fpre4 through the four optical fibers 111 to 114, respectively, in the above-described manner. The receiving section 50 of the communication unit 30 receives the frames Fpre1 to Fpre4.

In the receiving section 50 of the communication unit 30, the frame decoder section 52 supplies, to the lane structure acquiring section 38, the transmission lane information TL1 included in each of the frames Fpre1 to Fpre4, the physical lane number PNT included in the header of each of the frames Fpre1 to Fpre4, and the physical lane number PNR of the physical lane PR that has received each of the frames Fpre1 to Fpre4. The lane structure acquiring section 38 then generates the physical lane correspondence information TBL1, based on these information.

FIGS. 9A and 9B each illustrate an example of the physical lane correspondence information TBL1, where FIG. 9A illustrates a case where the communication unit 20 is connected to the communication unit 30 as illustrated in FIG. 1 (case C1) and FIG. 9B illustrates a case where the communication unit 20 is connected to the communication unit 30 as illustrated in FIG. 2 (case C2).

In the case where the communication unit 20 is connected to the communication unit 30 as illustrated in FIG. 1 (the case C1), the physical lane PR1 (the physical lane number PNR=1) in the photodetecting section 51 of the communication unit 30 receives the frame Fpre1 that includes the physical lane number PNT having the value "1". Likewise, the physical lane PR2 (the physical lane number PNR=2) receives the frame Fpre2 that includes the physical lane number PNT having the value "2". The physical lane PR3 (the physical lane number PNR=3) receives the frame Fpre3 that includes the physical lane number PNT having the value "3". The physical lane PR4 (the physical lane number PNR=4) receives the frame Fpre4 that includes the physical lane number PNT having the value "4". Therefore, as illustrated in FIG. 9A, the value "1" of the physical lane number PNT corresponds to the value "1" of the physical lane number PNR, the value "2" of the physical lane number PNT corresponds to the value "2" of the physical lane number PNR, the value "3" of the physical lane number PNT corresponds to the value "3" of the physical lane number PNR, and the value "4" of the physical lane number PNT corresponds to the value "4" of the physical lane number PNR.

On the other hand, in the case where the communication unit 20 is connected to the communication unit 30 as illustrated in FIG. 2 (the case C2), the physical lane PR1 (the physical lane number PNR=1) in the photodetecting section 51 of the communication unit 30 receives the frame Fpre4 that includes the physical lane number PNT having the value "4". Likewise, the physical lane PR2 (the physical lane number PNR=2) receives the frame Fpre3 that includes the physical lane number PNT having the value "3". The physical lane PR3 (the physical lane number PNR=3) receives the frame Fpre2 that includes the physical lane number PNT having the value "2". The physical lane PR4 (the physical lane number PNR=4) receives the frame Fpre1 that includes the physical lane number PNT having the value "1". Therefore, as illustrated in FIG. 9B, the value "1" of the physical lane number PNT corresponds to the value "4" of the physical lane number PNR, the value "2" of the physical lane number PNT corresponds to the value "3" of the physical lane number PNR, the value "3" of the physical lane number PNT corresponds to the value "2" of the physical lane number PNR, and the value "4" of the physical lane number PNT corresponds to the value "1" of the physical lane number PNR.

The lane control section 35 acquires the physical lane correspondence information TBL1 from the lane structure acquiring section 38, and supplies the physical lane correspondence information TBL1 to the transmitting section 60 with use of the signal CTL31. The frame generating section 41 of the transmitting section 60 generates the frame Fpre that includes the physical lane correspondence information TBL1 in the data INF, based on the signal CTL31.

FIG. 10 illustrates a structure example of the frame Fpre generated by the frame generating section 41 of the transmitting section 60. The frame generating section 41 generates four frames Fpre11 to Fpre14 in this example. Specifically, the frame generating section 41 adds, to the data INF (the physical lane correspondence information TBL1), the synchronization information SYNC, the physical lane number PNT having the value "1", and the logical lane number LN having the value "0", to generate the frame Fpre11. Likewise, the frame generating section 41 adds, to the data INF (the physical lane correspondence information TBL1), the synchronization information SYNC, the physical lane number PNT having the value "2", and the logical lane number LN having the value "0", to generate the frame Fpre12. The frame generating section 41 adds, to the data INF (the physical lane correspondence information TBL1), the synchronization information SYNC, the physical lane number PNT having the value "3", and the logical lane number LN having the value "0", to generate the frame Fpre13. The frame generating section 41 adds, to the data INF (the physical lane correspondence information TBL1), the synchronization information SYNC, the physical lane number PNT having the value "4", and the logical lane number LN having the value "0", to generate the frame Fpre14. In other words, the frames Fpre11 to Fpre14 are different only in physical lane number PNT of the header H from one another.

The lane mapping section 42 of the transmitting section 60 supplies the frame F to the physical lane PL corresponding to the physical lane number PNT, based on the physical lane number PNT of the header H in each of the frames Fpre11 to Fpre14.

The transmitting section 60 of the communication unit 30 transmits the frames Fpre11 to Fpre14 through the four optical fibers 121 to 124 in the above-described manner. The receiving section 70 of the communication unit 20 then receives the frames Fpre11 to Fpre14.

In the receiving section 70 of the communication unit 20, the frame decoder section 52 supplies the physical lane correspondence information TBL1 included in the data INF of each of the frames Fpre11 to Fpre14, to the lane control section 25 through the lane structure acquiring section 28.

The lane control section 25 of the communication unit 20 and the lane control section 35 of the communication unit 30 each acquire the physical lane correspondence information TBL1 in this way.

(ON-OFF Control of Physical Lane)

The communication units 20 sets each of the physical lanes PT1 to PT4 to one of the ON state and the OFF state, and the communication unit 30 sets each of the physical lanes PR1 to PR4 to one of the ON state and the OFF state (step S3). Specifically, in the communication unit 20, the lane control section 25 sets the physical lane PT to be used of the physical lanes PT1 to PT4 of the light emitting section 43, to the ON state, and sets the physical lanes PT not to be used to the OFF state, based on the physical lane correspondence information TBL1. Likewise, in the communication unit 30, the lane control section 35 sets the physical lane PR to be used of the physical lanes PR1 to PR4 of the photodetecting section 51, to the ON state, and sets the physical lanes PR not to be used to the OFF state, based on the physical lane correspondence information TBL1.

In this example, as illustrated in FIG. 9A or FIG. 9B, the four physical lanes PT1 to PT4 in the light emitting section 43 correspond to the four physical lanes PR1 to PR4 in the photodetecting section 51. This allows all of the physical lanes PT1 to PT4 and PR1 to PR4 to be used. The lane control section 25 thus sets all of the physical lanes PT1 to PT4 in the light emitting section 43 to the ON state, and the lane control section 35 thus sets all of the physical lanes PR1 to PR4 in the photodetecting section 51 to the ON state.

(Data Communication)

The communication unit 20 then performs data communication to the communication unit 30. The data communication is described below by taking two examples, the case where the communication unit 20 is connected to the communication unit 30 as illustrated in FIG. 1 (the case C1) and the case where the communication unit 20 is connected to the communication unit 30 as illustrated in FIG. 2 (the case C2).

FIGS. 11A to 11E illustrate operation examples of the communication units 20 and 30 in the case where the communication unit 20 is connected to the communication unit 30 as illustrated in FIG. 1 (the case C1), where FIG. 11A illustrates output signals of the respective processing sections 221 to 224, FIG. 11B illustrates signals to be transmitted by the respective physical lanes PT1 to PT4, FIG. 11C illustrates signals to be received by the respective physical lanes PR1 to PR4, FIG. 11D illustrates output signals of the frame decoder section 52, and FIG. 11E illustrates input signals of the respective processing sections 371 to 374.

The processing sections 221 to 224 each generate the data INF. As illustrated in FIG. 11A, the processing sections 221 to 224 generate data INF1 to INF4, respectively, in this example.

The frame generating section 41 then performs assignment of the logical lanes to generate the frame F. Specifically, the frame generating section 41 selects the data INF supplied from each of the processing sections 221 to 224, based on transmission capability from tee communication unit 20 to the communication unit 30 and transmission priority of the data INF. The frame generating section 41 then generates the header H that includes the synchronization information SYNC, the physical lane number PNT corresponding to the physical lane PT to be used of the physical lanes PT1 to PT4, and the logical lane number LN corresponding to the processing section that has supplied the data INF of the processing sections 221 to 224. The frame generating section 41 adds the header H to the data INF to generate the frame F.

The lane mapping section 42 supplies, based on the physical lane number PNT in the header of the frame F, the frame F to the physical lane PT corresponding to the physical lane number PNT, of the physical lanes PT1 to PT4.

In this example, as illustrated in FIG. 11B, the physical lane PT1 transmits the frame F1 that includes the synchronization information SYNC, the physical lane number PNT having the value "1", the logical lane number LN having the value "1", and the data INF1. The physical lane PT2 transmits the frame F2 that includes the synchronization information SYNC, the physical lane number PNT having the value "2", the logical lane number LN having the value "2", and the data INF2. The physical lane PT3 transmits the frame F3 that includes the synchronization information SYNC, the physical lane number PNT having the value "3", the logical lane number LN having the value "3", and the data INF3. The physical lane PT4 transmits the frame F4 that includes the synchronization information SYNC, the physical lane number PNT having the value "4", the logical lane number LN having the value "4", and the data INF4.

The transmitting section 40 of the communication unit 20 transmits the frames F1 to F4 through the four optical fibers 111 to 114, respectively, in this way. The receiving section 50 of the communication unit 30 receives the frames F1 to F4. In this example, the communication unit 20 is connected to the communication unit 30 as illustrated in FIG. 1. Therefore, in the photodetecting section 51 of the communication unit 30, the physical lane PR1 receives the frame F1, the physical lane PR2 receives the frame F2, the physical lane PR3 receives the frame F3, and the physical lane PR4 receives the frame F4 as illustrated in FIG. 11C.

The frame decoder section 52 removes the synchronization information SYNC and the physical lane number PNT from the frame F, and supplies the remaining part, i.e., the logical number LN and the data INF, to the lane demapper section 53. As illustrated in FIG. 11D, in this example, the frame decoder section 52 supplies, to the lane demapper section 53, the logical lane number LN having the value "1 and the data INF1" that are included in the frame F1, the logical lane number LN having the value "2" and the data INF2 that are included in the frame F2, the logical lane number LN having the value "3" and the data INF3 that are included in the frame F3, and the logical lane number LN having the value "4" and the data INF3 that are included in the frame 4.

The lane demapper section 53 supplies, based on the logical lane number LN added to the data INF, the data INF to the processing section assigned with the logical lane number LN, out of the processing sections 371 to 374. As illustrated in FIG. 11E, in this example, the lane demapper section 53 supplies the data INF1 with the logical lane number LN having the value "1" to the processing section 371, supplies the data INF2 with the logical lane number LN having the value "2" to the processing section 372, supplies the data INF3 with the logical lane number LN having the value "3" to the processing section 373, and supplies the data INF4 with the logical lane number LN having the value "4" to the processing section 374.

FIGS. 12A to 12E illustrate operation examples of the communication units 20 and 30 in the case where the communication unit 20 is connected to the communication unit 30 as illustrated in FIG. 2 (the case C2).

As illustrated in FIG. 12A, the processing sections 221 to 224 each generate the data INF, similarly to the case C1 (FIG. 11A). As illustrated in FIG. 12B, the transmitting section 40 then transmits the frames F1 to F4, similarly to the case C1 (FIG. 11B).

The communication unit 20 is connected to the communication unit 30 as illustrated in FIG. 2 in this example. Therefore, in the photodetecting section 50 of the communication unit 30, the physical lane PR1 receives the frame F4, the physical lane PR2 receives the frame F3, the physical lane PR3 receives the frame F2, and the physical lane PR4 receives the frame F1, as illustrated in FIG. 12C.

As illustrated in FIG. 12D, the frame decode section 52 removes the synchronization information SYNC and the physical lane number PNT from the frame F and supplies the remaining part, i.e., the logical lane number LN and the data INF, to the lane demapper section 53.

As illustrated in FIG. 12E, the lane demapper section 53 supplies the data INF1 with the logical lane number LN having the value "1" to the processing section 371, supplies the data INF2 with the logical lane number LN having the value "2" to the processing section 372, supplies the data INF3 with the logical lane number LN having the value "3" to the processing section 373, and supplies the data INF4 with the logical lane number LN having the value "4" to the processing section 374.

As described above, in the communication system 1, the four physical lanes PT1 to PT4 in the communication unit 20 transmits the transmission lane information TL1 relating to the physical lane number PNT of the physical lane PT usable in the light emitting section 43. When one or more of the four optical fibers 111 to 114 transmits a signal, the receiving section 50 of the communication unit 30 receives the transmission lane information TL1. For example, in a case where any of the terminals of the optical fibers 111 to 114 in the connectors 13 and 14 of the optical cable 10 is dirty, some of the optical fibers 111 to 114 may not transmit a signal. For example, as will be described later as modification 2, for example, in a case where the number of implemented physical lanes PT and PR is small in the communication units 20 and 30, some of the optical fibers 111 to 114 may not transmit the signal. In the communication system 1, all of the physical lanes PT implemented in the light emitting section 43 of the communication unit 20 transmit the same transmission lane information TL1, which makes it possible to reduce the possibility that the transmission information TL1 is not received by the receiving section 50 of the communication unit 30.

Also, in the communication system 1, the communication unit 20 puts the physical lane PT not to be used of the physical lanes PT1 to PT4 into the OFF state, and the communication unit 30 puts the physical lane PR not to be used of the physical lanes PR1 to PR4 into the OFF state, based on the physical lane correspondence information TBL1. This may make it possible to reduce power consumption in the communication system 1, for example. The laser diode relating to the physical lane PT not to be used of the physical lanes PT1 to PT4 does not emit light. It is thus possible to reduce the possibility that the optical signal hits the user even if the optical cable 10 is broken, which makes it possible to enhance safety.

Further, the logical lanes are assigned in the communication system 1. This makes it possible to perform the data communication irrespective of the communication state where the communication unit 20 is connected to the communication unit 30 as illustrated in FIG. 1 (the case C1) or as illustrated in FIG. 2 (the case C2).

Effects

As described above, in the present embodiment, the four physical lanes PT1 to PT4 each transmit the transmission lane information, which makes it possible to reduce possibility that the transmission lane information is not received by the receiving section.

In the present embodiment, the physical lanes not to be used are put into the OFF state, which makes it possible to reduce power consumption and to enhance safety.

In the present embodiment, the logical lanes are assigned, which makes it possible to perform the data communication irrespective of the connection state between the communication unit 20 and the communication unit 30.

Modification 1

In the above-described embodiment, the light emitting section 43 is connected to the photodetecting section 51 with use of the four optical fibers 111 to 114; however, the connection is not limited thereto. Alternatively, for example, the light emitting section 43 is connected to the photodetecting section 51 with use of two or three optical fibers, or five or more optical fibers. In this case, the number of physical lanes PT in the light emitting section 43 may be equal to the number of the optical fibers. Likewise, the number of the physical lanes PR in the photodetecting section 51 may be equal to the number of the optical fibers.

Modification 2

In the above-described embodiment, the number of the physical lanes PT1 to PT4 in the light emitting section 43 is equal to the number of the optical fibers 111 to 114, and the number of the physical lanes PR1 to PR4 in the photodetecting section 71 is equal to the number of the optical fibers 121 to 124; however, the configuration is not limited thereto. The present modification is described in detail below.

FIG. 13 illustrates a configuration example of a communication system 1B according to the present modification. The communication system 1B includes a communication unit 20B. The communication unit 20B includes a transmitting section 40B, a light emitting section 43B, a photodetecting section 71B, a receiving section 70B, and a lane control section 25B.

FIG. 14 illustrates a configuration example of the transmitting section 40B and the light emitting section 43B. The light emitting section 43B includes two LD sections 431 and 432 respectively corresponding to the physical lanes PT1 and PT2. The transmitting section 40B includes a lane mapping section 42B.

FIG. 15 illustrates a configuration example of the photodetecting section 71B and the receiving section 70B. The photodetecting section 71B includes two PD sections 511 and 512 respectively corresponding to the physical lanes PR1 and PR2. The receiving section 70B includes a frame decoder section 52B and a lane demapper section 53B.

The lane control section 25B controls the transmitting operation in the transmitting section 40B and the light emitting section 43B with use of the signal CTL21, based on the physical lane correspondence information TBL1. The lane control section 25B also has a function of generating the transmission lane information TL1 and supplying the transmission lane information TL1 to the transmitting section 40B with use of the signal CTL21, in the preparation operation before the data communication.

The lane control section 25B also has a function of controlling the receiving operation in the photodetecting section 71B with use of the signal CTL2, based on the physical lane correspondence information TBL2.

(Data Communication from Communication Unit 20B to Communication Unit 30)

In the communication unit 20B, the transmitting section 40B generates the frame Fpre that includes the transmission lane information TL1 in the data INF, and transmits the frame Fpre to the receiving section 50 of the communication unit 30, before the data communication.

FIG. 16 illustrates a structure example of the transmission lane information TL1. In this example, as illustrated in FIG. 14, the two physical lanes PT1 and PT2 are implemented in the light emitting section 43B. The lane control section 25B thus generates the transmission lane information TL1 including the physical lane number PNT of the two physical lanes PT1 and PT2. The frame generating section 41 of the transmitting section 40B generates the frame Fpre that includes the transmission lane information TL1 in the data INF.

In the communication unit 30, the receiving section 50 receives the frame Fpre. The lane structure acquiring section 38 generates the physical lane correspondence information TBL1, based on the transmission lane information TL1 included in the frame Fpre, the physical lane number PNT included in the header H of the frame Fpre, and the physical lane number PNR of the physical lane PR that has received the frame Fpre.

FIG. 17 illustrates an example of the physical lane correspondence information TBL1 in the case where the communication unit 20B is connected to the communication unit 30 as illustrated in FIG. 13. In this example, the physical lane PR1 (the physical lane number PNR=1) in the receiving section 51 of the communication unit 30 receives the frame Fpre1 that includes the physical lane number PNT having the value "1", and the physical lane PR2 (the physical lane number PNR=2) receives the frame Fpre2 that includes the physical lane number PNT having the value "2". Therefore, as illustrated in FIG. 17, the value "1" of the physical lane number PNT corresponds to the value "1" of the physical lane number PNR, and the value "2" of the physical lane number PNT corresponds to the value "2" of the physical lane number PNR.

The lane control section 35 supplies the physical lane correspondence information TBL1 to the lane control section 25B of the communication unit 20B through the optical fibers 121 to 124. The communication units 20 and 30 each acquire the physical lane correspondence information TBL1 accordingly.

The lane control section 25B of the communication unit 20B sets all of the physical lanes PT1 and PT2 in the light emitting section 43B to the ON state, based on the physical lane correspondence information TBL1. The lane control section 35 of the communication unit 30 sets the two physical lanes PR1 and PR2 of the physical lanes PR1 to PR4 in the photodetecting section 51 to the ON state, and sets the remaining two physical lanes PR3 and PR4 to the OFF state. The communication unit 20 then performs the data communication to the communication unit 30.

(Data Communication from Communication Unit 30 to Communication Unit 20)

In the communication unit 30, the transmitting section 60 generates the frame Fpre that includes the transmission lane information TL2 in the data INF, and transmits the frame Fpre to the receiving section 70B of the communication unit 20B, before the data communication. The transmission lane information TL2 is similar to that illustrated in FIG. 7.

In the communication unit 20B, the receiving section 70 receives the frame Fpre. The lane structure acquiring section 28 generates the physical lane correspondence information TBL2, based on the transmission lane information TL2 included in the frame Fpre, the physical lane number PNT included in the header H of the frame Fpre, and the physical lane number PNR of the physical lane PR that has received the frame Fpre.

FIG. 18 illustrates an example of the physical lane correspondence information TBL2 in the case where the communication unit 20B is connected to the communication unit 30 as illustrated in FIG. 13. In this example, the physical lane PR1 (the physical lane number PNR=1) in the photodetecting section 71B of the communication unit 20B receives the frame Fpre1 that includes the physical lane number PNT having the value "1", and the physical lane PR2 (the physical lane number PNR=2) receives the frame Fpre2 that includes the physical lane number PNT having the value "2". Therefore, as illustrated in FIG. 18, the value "1" of the physical lane number PNT corresponds to the value "1" of the physical lane number PNR, and the value "2" of the physical lane number PNT corresponds to the value "2" of the physical lane number PNR. Note that there is no physical lane number PNR corresponding to the value "3" of the physical lane number PNT, and there is no physical lane number PNR corresponding to the value "4" of the physical lane number PNT.

The lane control section 25B supplies the physical lane correspondence information TBL2 to the lane control section 35 of the communication unit 30 through the optical fibers 111 to 114. The communication units 20B and 30 each acquire the physical lane correspondence information TBL2 accordingly.

The lane control section 35 of the communication unit 30 sets the two physical lanes PT1 and PT2 of the physical lanes PT1 to PT4 in the light emitting section 63 to the ON state and sets the remaining two physical lanes PT3 and PT4 to the OFF state, based on the physical lane correspondence information TBL2. The lane control section 25B of the communication unit 20B sets all of the physical lanes PR1 and PR2 in the photodetecting section 71B to the ON state, based on the physical lane correspondence information TBL2. The communication unit 30 then performs the data communication to the communication unit 20B.

In the present embodiment of the technology, it is possible to perform communication with use of the implemented physical lanes even if the number of the implemented physical lanes is smaller than the number of the optical fibers.

Modification 3

In the above-described embodiment, the data communication is performed bi-directionally between the communication unit 20 and the communication unit 30; however, the data communication is not limited thereto. For example, as with a communication system 1C illustrated in FIG. 19, the data communication may be performed unidirectionally. The communication system 1C includes an optical cable 10C, a communication unit 20C, and a communication unit 30C.

The optical cable 10C includes the four optical fibers 111 to 114 and connectors 13C and 14C. The optical fibers 111 to 114 each transmit an optical signal from the communication unit 20 to the communication unit 30. The connector 13C is provided at a first end of the optical cable 10C and is coupled to a connector 21C of the communication unit 20C. The connector 14C is provided at a second end of the optical cable 10C and is coupled to a connector 31C of the communication unit 30C.

The communication unit 20C includes the connector 21C, the processing sections 221 to 224, the transmitting section 40, the light emitting section 43, the connection detection section 24, a receiving section 29C, and a lane control section 25C. The connector 21C is coupled to the connector 13C of the optical cable 10C. The receiving section 29C receives the physical lane correspondence information TBL1 that is supplied from a transmitting section 39C (described later) of the communication unit 30C. The receiving section 29C and the transmitting section 39C may perform communication through electric signals or optical signals. The lane control section 25C controls the transmitting operation in the transmitting section 40 and the light emitting section 43 with use of the signal CTL21, similarly to the lane control section 25 according to the above-described embodiment.

The communication unit 30C includes the connector 31C, the photodetecting section 51, the receiving section 50, the processing sections 371 to 374, the lane structure acquiring section 38, a lane control section 35C, and the transmitting section 39C. The connector 31C is coupled to the connector 14C of the optical cable 10C. The lane control section 35C controls receiving operation in the photodetecting section 51 with use of the signal CTL32, based on the physical lane correspondence information TBL1, similarly to the lane control section 35 according to the above-described embodiment. The transmitting section 39C transmits the physical lane correspondence information TBL1 to the receiving section 29C of the communication unit 20C.

Other Modifications

Two or more of these modifications may be combined.

Hereinbefore, although the technology has been described with referring to the embodiment and the modifications, the technology is not limited thereto, and various modifications may be made.

For example, in the above-described embodiment, the data communication is performed with use of the optical signals; however, the signal is not limited thereto. Alternatively, the data communication may be performed with use of electric signals.

APPLICATION EXAMPLE

With reference to FIG. 20, an example of a schematic configuration of a surgery system to which the communication system according to the embodiment of the disclosure is applied. FIG. 20 is an explanatory diagram for explaining an example of the schematic configuration of the surgery system to which the communication system according to the embodiment of the disclosure.

For example, FIG. 20 illustrates an example of an endoscope surgery system 100 including a rigid endoscope, used in abdominal endoscope surgery that is performed in place of an existing abdominal open surgery on a medical site. As illustrated in FIG. 20, in the abdominal endoscope surgery, opening apparatuses called trocars 250a and 250b are attached at several points of the abdominal wall, and a laparoscope (hereinafter, also referred to as an endoscope) 110, an energy treatment tool 220, forceps 230, etc. are inserted into a body through holes provided in the trocars 250a and 250b, in place of incision in the abdominal wall. Then, treatment such as excision of an affected area U such as tumor, with use of the energy treatment tool 220 or the like is performed with real time viewing of an image of the affected area U that is captured by the endoscope 110. Note that the endoscope 110, the energy treatment tool 220, and the forceps 230 are held by an operator, an assistant, a scopist, a robot, etc.

In an operating room in which such endoscope surgery is performed, a cart 310 on which devices for the endoscope surgery are mounted, a bed for a patient 330 on which the patient lies, a foot switch 350, and the like are disposed. For example, as medical devices, devices such as a camera control unit (CCU) 130, a light source unit 170, a device for treatment tools 210, a pneumoperitoneum device 240, a display unit 150, a recorder 260, a printer 270 may be mounted on the cart 310.

The endoscope 110 generates an image signal of the affected area U by an image pickup device provided for each wavelength region, and transmits the image signal to the CCU 130 through a camera cable. Here, for example, the camera cable may be configured of the optical cable 10 in FIG. 1. In this case, the endoscope 110 and the CCU 130 respectively correspond to the communication unit 20 and the communication unit 30 in FIG. 1, and are connected to each other through the optical cable 10.

The CCU 130 performs signal processing on the image signal output from the endoscope 110, and outputs the processed image signal to the display unit 150. With this configuration, the endoscope image of the affected area U is displayed on the display unit 150.

Note that the CCU 130 may output the processed image signal to the recorder 260 to allow the recorder 260 to hold the endoscope image of the affected area U as image data (for example, moving image data). The CCU 130 may output the processed image signal to the printer 270 to allow the printer 270 to print out the endoscope image of the affected area U.

The light source unit 170 is connected to the endoscope 110 through a light guide cable, and is adapted to apply light to the affected area U while changing over light with various wavelengths. Note that the light applied from the light source unit 170 may be used as auxiliary light.

The device for treatment tools 210 may correspond to, for example, a high-frequency output device outputting a high-frequency current to the energy treatment tool 220 that uses electric heat to excise the affected area U.

The pneumoperitoneum device 240 includes an insufflation and inspiration device to insufflate air into, for example, an abdominal region in the body of the patient.

The foot switch 350 controls the CCU 130, the device for treatment tools 210, and the like in response to the foot operation by the operator, the assistant, etc., as a trigger signal.

Hereinbefore, although the example of the schematic system configuration of the endoscope surgery system 100 is described as a system configuration to which the communication units according to the embodiment of the disclosure are applied, with reference to FIG. 20, the communication units according to the embodiment of the disclosure may be applied to a microscopic surgery system including a surgical microscope in place of the endoscope, and the like.

Note that the effects described in the present specification are illustrative and non-limiting. Effects achieved by the technology may be effects other than those described above.

Note that the technology may be configured as follows.

(1) A communication device including: circuitry configured to generate transmission lane information that identifies a plurality of transmission lanes, and to output the transmission lane information to each of the plurality of transmission lanes.

(2) The communication device of (1), wherein the circuitry configured to output the transmission lane information to each of the plurality of transmission lanes by:
generating a setup-frame for each of the plurality of transmission lanes, each of the setup-frames including the transmission lane information and a lane identifier for the corresponding transmission lane, and directing each of the setup-frames to one of the plurality of transmission lanes based on the lane identification number of the respective setup-frame.

(3) The communication device of (2), wherein the circuitry is configured to:
receive data that is to be transmitted, for each predetermined portion of the data, generate a transmission frame that includes a lane identifier and the respective portion of the data, and direct each of the transmission frames to one of the plurality of transmission lanes based on the lane identifier of the respective transmission frame.

(4) The communication device of (3), wherein the circuitry receives the data from a plurality of information sources, and each of the transmission frames further includes a logical lane number that is assigned based on which one of the plurality of information sources supplied the portion of the data that is included in the respective transmission frame.

(5) The communication device of (2), wherein the circuitry is configured to determine usable transmission lanes from among a plurality of communication lanes, and generate the transmission lane information such that the plurality of transmission lanes that are identified by the transmission lane information are the usable transmission lanes.

(6) The communication device of (2), wherein the circuitry is configured to control a plurality of communication lanes, including the plurality of transmission lanes identified in the transmission lane information, based on physical lane correspondence information received from a device to which the transmission lane information was transmitted, and the physical lane correspondence information indicates a correspondence relationship between the plurality of transmission lanes and a plurality of reception lanes of the device to which the transmission lane information was transmitted.

(7) The communication device of (1), wherein the plurality of transmission lanes each include light emitting circuitry that is configured to transmit data by light emission.

(8) The communication device of claim (7), wherein, for each of the plurality of transmission lanes, the light emitting circuitry includes a laser that transmits the data by light emission and a driver that controls the laser.

(9) A communication device including: circuitry configured to receive transmission lane information via each of a plurality of reception lanes and to generate physical lane correspondence information based on the received transmission lane information, wherein the transmission lane information identifies a plurality of transmission lanes of a device that transmitted the transmission lane information, and the physical lane correspondence information indicates a correspondence relationship between the plurality of transmission lanes and the plurality of reception lanes.

(10) The communication device of (9), wherein the circuitry is configured to receive a setup-frame from each of the plurality of reception lanes, each of the setup-frames including the transmission lane information and a transmission lane identifier, and generate the physical lane correspondence information based on the transmission lane identifiers and on an identification of which ones of the plurality of reception lanes received which ones of the setup-frames.

(11) The communication device of (10), wherein the circuitry is configured to:
receive transmission frames that each include transmission data and a logical lane number, and direct the data from each of the transmission frames to one of a plurality of processing sections based on the logical lane number of the respective transmission frame.

(12) The communication device of (9), wherein the circuitry is configured to transmit the physical lane correspondence information to a device that transmitted the transmission lane information.

(13) The communication device of (9), wherein the circuitry is configured to control a plurality of communication lanes, including the plurality of reception lanes, based on the physical lane correspondence information.

(14) The communication device of (9), wherein the plurality of reception lanes each include light detecting circuitry that is configured to receive data transmitted by light emission.

(15) The communication device of (14), wherein, for each of the plurality of reception lanes, the light detecting circuitry includes a light sensor and reception circuitry configured to convert an output of the light sensor into reception data.

(16) A communication system including: a first communication device that includes circuitry configured to generate transmission lane information that identifies a plurality of transmission lanes, and to output the transmission lane information to each of the plurality of transmission lanes; a second communication device that includes circuitry configured to receive the transmission lane information via each of a plurality of reception lanes and to generate physical lane correspondence information based on the transmission lane information; and a connector coupling the plurality of transmission lanes of the first communication device with the plurality of reception lanes of the second communication device, wherein the physical lane correspondence information indicates a correspondence relationship between the plurality of transmission lanes of the first communication device and the plurality of reception lanes of the second communication device.

(17) The communication system of (16), wherein the second communication device is configured to transmit the physical lane correspondence information to the first communication device, the first communication device controls a first plurality of communication lanes, including the plurality of transmission lanes, based on the physical lane correspondence information, and the second communication device controls a second plurality of communication lanes, including the plurality of reception lanes, based on the physical lane correspondence information.

(18) The communication system of (16), wherein the plurality of transmission lanes each include light emitting circuitry that is configured to transmit data by light emission, and the plurality of reception lanes each include light detecting circuitry that is configured to receive data transmitted by light emission.

(19) The communication system of (18), wherein, for each of the plurality of transmission lanes, the light emitting circuitry includes a laser that transmits the data by light emission and a driver that controls the laser, and for each of the plurality of reception lanes, the light detecting circuitry includes a light sensor and reception circuitry configured to convert an output of the light sensor into reception data.

(20) A surgical system, including: a surgical imaging device configured to output an image signal; a first communication device that includes circuitry configured to generate transmission lane information that identifies a plurality of transmission lanes, and to output the transmission lane information to each of the plurality of transmission lanes; a second communication device that includes circuitry configured to receive the transmission lane information via each of a plurality of reception lanes and to generate physical lane correspondence information based on the transmission lane information; and a cable coupling the plurality of transmission lanes of the first communication device with the plurality of reception lanes of the second communication device, wherein the physical lane correspondence information indicates a correspondence relationship between the plurality of transmission lanes of the first communication device and the plurality of reception lanes of the second communication device, and one of the first communication device and the second communication device is included in the surgical imaging device.

(21) The surgical system of (20), further including; an image processing apparatus configured to receive the image signal via the cable and process the image signal, and wherein one of the first communication device and the second communication device is included in the image processing apparatus.

(22) The surgical system of (20), wherein the cable is comprised of an optical cable.

(23) A communication unit including:
a transmitting section configured to supply first lane information to each of a predetermined number of transmission lanes, the first lane information including a predetermined number of transmission lane identifiers corresponding to the predetermined number of respective transmission lanes.

(24) The communication unit according to (23), in which the transmitting section generates a first frame and supplies the first frame to a first transmission lane of the predetermined number of transmission lanes, the first frame including the first lane information and a transmission lane identifier that corresponds to the first transmission lane.

(25) The communication unit according to (24), further including:
a receiving section configured to receive a second lane information including one or a plurality of transmission lane identifiers that correspond to one or a plurality of respective transmission lanes out of the predetermined number of transmission lanes, the one or the plurality of transmission lanes each transmitting a signal receivable by a communication partner; and a transmission control section configured to generate, based on the second lane information, a control signal to set each of the transmission lanes to one of ON state and OFF state.

(26) The communication unit according to (25), in which the second lane information is information indicating correspondence relationship between the predetermined number of transmission lane identifiers and a predetermined number of reception lane identifiers that correspond to a predetermined number of respective reception lanes in the communication partner.

(27) The communication unit according to (25) or (26) further including a plurality of processing sections corresponding to respective data identifiers, each of the plurality of processing sections being configured to generate transmission data, in which
the transmitting section generates a second frame including transmission data and a data identifier and supplies the second frame to a second transmission lane of the one or the plurality of transmission lanes set to the ON state, the transmission data being generated by one of the plurality of processing sections, and the data identifier corresponding to the one processing section.

(28) The communication unit according to any one of (23) to (27), further including:
the predetermined number of transmission lanes; and
a connector adapted to be connectable with a communication partner through a plurality of communication lanes that includes a predetermined number of communication lanes corresponding to the predetermined number of transmission lanes

(29) A communication unit including
a receiving section configured to receive first lane information from a first reception lane of a predetermined number of reception lanes, the first lane information including a predetermined number of transmission lane identifiers corresponding to a predetermined number of respective transmission lanes in a communication partner.

(30) The communication unit according to (29), in which the receiving section receives a first frame including the first lane information and one transmission lane identifier from the first reception lane, the one transmission lane identifier corresponding to a transmission lane that transmits the first lane information, out of the predetermined number of transmission lanes.

(31) The communication unit according to (30), further including
a reception control section configured to generate second lane information, based on the first lane information and the one transmission lane identifier that are included in the first frame, the second lane information indicating correspondence relationship between the predetermined number of transmission lane identifiers and a predetermined number of reception lane identifiers that correspond to the predetermined number of respective reception lanes.

(32) The communication unit according to (31), in which the reception control section further generates, based on the second lane information, a control signal to set each of the reception lanes to one of ON state and OFF state.

(33) The communication unit according to (31) or (32), further including
a transmitting section configured to transmit the second lane information to the communication partner.

(34) The communication unit according to (32) or (33), further including
a plurality of processing sections corresponding to respective data identifiers, wherein the receiving section receives the second frame that includes transmission data and one of the data identifiers, from the second reception lane of the one or the plurality of reception lanes that are set to the ON state, and supplies the transmission data to one of the plurality of processing sections that corresponds to the one of the data identifiers.

(35) The communication unit according to any one of (29) to (34), further including: the predetermined number of reception lanes; and
a connector adapted to be connectable with the communication partner through a plurality of communication lanes that includes a predetermined number of communication lanes corresponding to the predetermined number of respective reception lanes.

(36) A communication system including:
a first communication unit including a transmitting section that supplies first lane information to each of a predetermined number of transmission lanes, the first lane information including a predetermined number of transmission lane identifiers corresponding to the predetermined number of respective transmission lanes, the predetermined number of transmission lanes corresponding to a first predetermined number of communication lanes out of a plurality of communication lanes; and
a second communication unit including a receiving section that receives the first lane information from a first reception lane of a predetermined number of reception lanes, the predetermined number of reception lanes corresponding to a second predetermined number of communication lanes out of the plurality of communication lanes.

(37) A communication method including:
supplying first lane information to each of a predetermined number of transmission lanes corresponding to a first predetermined number of communication lanes out of a plurality of communication lanes, the first lane information including a predetermined number of transmission lane identifiers that correspond to the predetermined number of respective transmission lanes; and
receiving the first lane information from a first reception lane of a predetermined number of reception lanes corresponding to a second predetermined number of communication lanes out of the plurality of communication lanes.

(38) The communication method according to (37), further including:
supplying a first frame to a first transmission lane of the predetermined number of transmission lanes, the first frame including the first lane information and one of the transmission lane identifiers corresponding to the first transmission lane; and
receiving the first frame from the first reception lane.

(39) The communication method according to (38), further including:
generating second lane information, based on the one of the transmission lane identifiers and the first lane information that are included in the first frame received from the first reception lane, the second lane information indicating correspondence relationship between the predetermined number of transmission lane identifiers and a predetermined number of reception lane identifiers that correspond to the predetermined number of respective reception lanes; and
setting each of the transmission lanes to one of ON state and OFF state and setting each of the reception lanes to one of ON state and OFF state, based on the second lane information.

(40) The communication method according to (39), further including:

supplying a second frame that includes transmission data and a data identifier, to a second transmission lane of one or a plurality of transmission lanes each set to the ON state;

receiving the second frame from a second reception lane of one or a plurality of reception lanes each set to the ON state; and supplying the transmission data that is included in the second frame received by the second reception lane, to a processing section corresponding to the data identifier included in the second frame.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1, 1B, 1C Communication system
10 Optical cable
13, 14 Connector
20, 20B, 20C, 30, 30C Communication unit
21, 31 Connector
24, 34 Connection detection section
25, 25B, 25C, 35, 35C Lane control section
28, 38 Lane structure acquiring section
29C Receiving section
39C Transmitting section
40, 40B, 60 Transmitting section
41 Frame generating section
42, 42B Lane mapping section
50, 70, 70B Receiving section
52, 52B Frame decoder section
53, 53B Lane demapper section
100 Endoscope surgery system
110 Endoscope
111 to 114, 121 to 124 Optical fiber
130 CCU
150 Display unit
170 Light source unit
210 Device for treatment tools
220 Energy treatment tool
221 to 224, 321 to 324 Processing section
230 Forceps
240 Pneumoperitoneum device
250a, 250b Trocar
260 Recorder
270 Printer
271 to 274, 371 to 374 Processing section
310 Cart
330 Bed for patient
350 Foot switch
431 to 434 LD section
511 to 514 PD section
CTL21 to CTL23, CTL31 to CTL33 Signal
F, F1 to F4, Fpre, Fpre1 to Fpre4, Fpre11 to Fpre14 Frame
H Header
INF, INF1 to INF4 Data
LN Logical lane number
PNR, PNT Physical lane number
PR1 to PR4, PT1 to PT4 Physical lane
TBL1, TBL2 Physical lane correspondence information
TL1, TL2 Transmission lane information

The invention claimed is:

1. A surgical system, comprising:
a surgical imaging device configured to output an image signal;
a first communication device that includes circuitry configured to generate transmission lane information that individually identifies a physical lane number and a logical lane number for a plurality of transmission lanes of a first connector, and to output the transmission lane information to each of the plurality of transmission lanes;
a second communication device that includes circuitry configured to receive the transmission lane information via each of a plurality of reception lanes of a second connector, and to generate physical lane correspondence information based on the transmission lane information; and
a cable coupling the plurality of transmission lanes of the first communication device with the plurality of reception lanes of the second communication device,
wherein the physical lane correspondence information indicates a correspondence relationship between the plurality of transmission lanes of the first communication device and the plurality of reception lanes of the second communication device, and
one of the first communication device and the second communication device is included in the surgical imaging device.

2. The surgical system of claim 1, further comprising;
an image processing apparatus configured to receive the image signal via the cable and process the image signal, and
wherein one of the first communication device and the second communication device is included in the image processing apparatus.

3. The surgical system of claim 1, wherein the cable is comprised of an optical cable.

4. The surgical system of claim 1, wherein the circuitry of the first communication device is configured to output the transmission lane information to each of the plurality of transmission lanes by:
generating a setup-frame for each of the plurality of transmission lanes, each of the setup-frames including the transmission lane information for the corresponding transmission lane, and
directing each of the setup-frames to one of the plurality of transmission lanes based on the physical lane number of the respective setup-frame.

5. The surgical system of claim 4, wherein the circuitry of the first communication device is configured to:
receive data that is to be transmitted,
for each predetermined portion of the data, generate a transmission frame that includes the physical lane number and the respective portion of the data, and
direct each of the transmission frames to one of the plurality of transmission lanes based on the physical lane number of the respective transmission frame.

6. The surgical system of claim 5, wherein the circuitry of the first communication device receives the data from a plurality of information sources, and
each of the transmission frames further includes the logical lane number that is assigned based on which one of the plurality of information sources supplied the portion of the data that is included in the respective transmission frame.

7. The surgical system of claim 4,
wherein the circuitry of the first communication device is configured to
determine usable transmission lanes from among a plurality of communication lanes, and generate the transmission lane information such that the plurality of transmission lanes that are identified by the transmission lane information are the usable transmission lanes.

8. The surgical system of claim 4, wherein the circuitry of the first communication device is configured to control a plurality of communication lanes, including the plurality of transmission lanes identified in the transmission lane information, based on physical lane correspondence information received from the second communication device.

9. The surgical system of claim 1, wherein the plurality of transmission lanes each include light emitting circuitry that is configured to transmit data by light emission.

10. The surgical system of claim 9, wherein, for each of the plurality of transmission lanes, the light emitting circuitry includes a laser that transmits the data by light emission and a driver that controls the laser.

* * * * *